US008483161B2

(12) United States Patent
Ihm et al.

(10) Patent No.: US 8,483,161 B2
(45) Date of Patent: Jul. 9, 2013

(54) SYSTEM INFORMATION TRANSMISSION METHOD AND SUBFRAME STRUCTURE

(75) Inventors: Bin Chul Ihm, Gyeonggi-do (KR); Jeong Ki Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 12/990,479

(22) PCT Filed: Apr. 30, 2009

(86) PCT No.: PCT/KR2009/002316
§ 371 (c)(1), (2), (4) Date: Dec. 15, 2010

(87) PCT Pub. No.: WO2009/134103
PCT Pub. Date: Nov. 5, 2009

(65) Prior Publication Data
US 2011/0090860 A1 Apr. 21, 2011

Related U.S. Application Data

(60) Provisional application No. 61/048,954, filed on Apr. 30, 2008.

(51) Int. Cl.
*H04W 4/00* (2009.01)
(52) U.S. Cl.
USPC ........... 370/329; 370/312; 370/390; 370/432; 370/433; 370/350; 370/503; 370/504; 370/510; 370/328; 370/338; 375/260; 455/502
(58) Field of Classification Search
USPC ............... 370/312, 390, 432, 328, 338, 356, 370/366, 350, 503, 504, 510, 513, 514, 515, 370/502; 455/502; 375/260
See application file for complete search history.

(56) References Cited

U.S. PATENT DOCUMENTS

| 6,788,959 | B2 * | 9/2004 | Jokinen et al. | 455/552.1 |
|---|---|---|---|---|
| 8,009,603 | B2 * | 8/2011 | Lu et al. | 370/312 |
| 8,089,911 | B2 * | 1/2012 | Huang et al. | 370/312 |
| 8,149,686 | B2 * | 4/2012 | Kishiyama et al. | 370/208 |
| 8,151,305 | B2 * | 4/2012 | Doerr et al. | 725/62 |
| 8,223,625 | B2 * | 7/2012 | Malladi et al. | 370/208 |
| 2007/0036066 | A1 | 2/2007 | Thomas et al. | |
| 2007/0093253 | A1 * | 4/2007 | Lindoff et al. | 455/450 |
| 2007/0121744 | A1 * | 5/2007 | Zuckerman et al. | 375/260 |
| 2007/0201438 | A1 * | 8/2007 | Yoon et al. | 370/352 |
| 2008/0025241 | A1 * | 1/2008 | Bhushan et al. | 370/312 |

(Continued)

FOREIGN PATENT DOCUMENTS

KR 10-2005-0091582 9/2005

*Primary Examiner* — Ian N Moore
*Assistant Examiner* — Phong La
(74) *Attorney, Agent, or Firm* — Lee, Hong, Degerman, Kang & Waimey

(57) ABSTRACT

Methods for transmitting system information, subframe structures, and pilot structures in a wireless access system are disclosed. A method for receiving system information in a wireless access system includes receiving a Network Common Information (NCI) channel including network common system information from a Base Station (BS), receiving a synchronization channel from the BS, for acquiring synchronization with the BS, receiving a Cell Specific Information (CSI) channel including cell specific system information which is specific to the BS from the BS, and decoding the NCI channel and the CSI channel using the synchronization channel. The NCI channel is transmitted over a first frequency channel and the CSI channel is transmitted over a second frequency channel.

14 Claims, 24 Drawing Sheets

U.S. PATENT DOCUMENTS

| | | | |
|---|---|---|---|
| 2008/0039133 A1* | 2/2008 | Ma et al. | 455/552.1 |
| 2008/0072269 A1* | 3/2008 | Malladi et al. | 725/110 |
| 2008/0089282 A1* | 4/2008 | Malladi et al. | 370/329 |
| 2008/0198785 A1* | 8/2008 | Huang et al. | 370/312 |
| 2008/0273491 A1* | 11/2008 | Han et al. | 370/329 |
| 2008/0316995 A1* | 12/2008 | Bachu et al. | 370/345 |
| 2009/0028128 A1* | 1/2009 | Trott et al. | 370/350 |
| 2009/0219860 A1* | 9/2009 | Tanno et al. | 370/328 |
| 2010/0097972 A1* | 4/2010 | Parkvall et al. | 370/312 |
| 2010/0103906 A1* | 4/2010 | Montojo et al. | 370/335 |
| 2010/0177697 A1* | 7/2010 | Tanno et al. | 370/328 |
| 2010/0261472 A1* | 10/2010 | Han et al. | 455/434 |
| 2010/0265968 A1* | 10/2010 | Baldemair et al. | 370/503 |
| 2010/0278123 A1* | 11/2010 | Fong et al. | 370/329 |
| 2010/0296429 A1* | 11/2010 | Han et al. | 370/312 |
| 2010/0315963 A1* | 12/2010 | Jading et al. | 370/252 |
| 2011/0002430 A1* | 1/2011 | Kim et al. | 375/362 |
| 2011/0021224 A1* | 1/2011 | Koskinen et al. | 455/507 |
| 2011/0103338 A1* | 5/2011 | Astely et al. | 370/329 |
| 2011/0194632 A1* | 8/2011 | Clerckx et al. | 375/260 |
| 2012/0213157 A1* | 8/2012 | Jeong et al. | 370/328 |

* cited by examiner

SYSTEM INFORMATION TRANSMISSION METHOD AND SUBFRAME STRUCTURE

CROSS-REFERENCE TO RELATED APPLICATIONS

This application is the National Stage filing under 35 U.S.C. 371 of International Application No. PCT/KR2009/002316, filed Apr. 30, 2009, which claims the benefit of U.S. Provisional Application Ser. No. 61/048,954, filed on Apr. 30, 2008, the contents of all of which are incorporated by reference herein in their entirety.

FIELD OF THE INVENTION

The present invention relates to a wireless access system, and more particularly, to a method for transmitting system information, a subframe structure, and a pilot structure. The present invention also relates to a method for transmitting system information through a single frequency network.

DISCUSSION OF THE RELATED ART

A general frame structure used in a wireless access system will be described below.

FIG. 1 illustrates a frame structure used in a broadband wireless access system (e.g. Institute of Electrical and Electronics Engineers (IEEE) 802.16).

Referring to FIG. 1, the horizontal axis represents Orthogonal Frequency Division Multiple Access (OFDMA) symbols as time units and the vertical axis represents the logical numbers of subcarriers as frequency units, in a frame. A frame is divided into data sequence channels each having a predetermined duration according to the physical characteristics of the data sequence channels in FIG. 1. Specifically, a frame is divided into a DownLink (DL) subframe and an UpLink (UL) subframe.

A DL subframe may carry a preamble, a Frame Control Header (FCH), a DL-MAP, a UL-MAP, and one or more DL data bursts. A UL subframe may carry one or more UL data bursts and a ranging subchannel.

The preamble is a predetermined data sequence residing in the first symbol of each frame, for use in acquisition of synchronization with a Base Station (BS) and channel estimation at a Mobile Station (MS). The FCH provides information about channel allocation and channel coding of the DL-MAP. The DL-MAP and the UL-MAP are MAC messages carrying downlink and uplink channel resource assignments to MSs. The DL data bursts and the UL data bursts are data units that the BS transmits to MSs or MSs transmit to the BS.

A Downlink Channel Descriptor (DCD) that can be transmitted in the frame structure illustrated in FIG. 1 is a MAC message describing the physical characteristics of a downlink channel and an Uplink Channel Descriptor (UCD) is a MAC message describing the physical characteristics of an uplink channel.

On a downlink, an MS may detect a preamble transmitted from a BS and then decode a DL-MAP using information acquired from an FCH. The BS may transmit scheduling information to MSs in every frame (e.g. every 5 ms) in a DL-MAP or UL-MAP message to allocate downlink or uplink resources to the MSs.

With the DL-MAP and UL-MAP structures described above with reference to FIG. 1, the BS may transmit a MAP message at a Modulation Coding Scheme (MCS) level that allows all MSs to receive the MAP message.

SUMMARY OF THE INVENTION

An object of the present invention is to provide a method for efficiently transmitting system information.

Another object of the present invention is to provide a method for transmitting system information through a Single Frequency Network (SFN) in order to reduce the amount of resources used for transmitting the system information and decrease channel noise.

Another object of the present invention is to provide a subframe structure for enabling efficient channel estimation when system information is provided and enabling reliable transmission of the system information.

Another object of the present invention is to provide a pilot structure for enabling efficient channel estimation when system information is provided and enabling reliable transmission of the system information.

A further object of the present invention is to provide a subframe structure, a preamble structure, and a pilot structure, for reducing inter-cell interference from neighbor BSs.

In addition to the above-described objects, the objects of the present invention include all other objects that can be derived from embodiments of the present invention.

The present invention relates to a wireless access system, and more particularly, to a method for transmitting system information, a subframe structure, and a pilot structure. The present invention also relates to a method for transmitting system information through an SFN.

In an aspect of the present invention, a method for receiving system information in a wireless access system includes receiving a Network Common Information (NCI) channel including network common system information from a BS, receiving a synchronization channel from the BS, for acquiring synchronization with the BS, receiving a Cell Specific Information (CSI) channel including cell specific system information which is specific to the BS from the BS, and decoding the NCI channel and the CSI channel using the synchronization channel. The NCI channel is transmitted over a first frequency channel and the CSI channel is transmitted over a second frequency channel.

The NCI channel, the synchronization channel, and the CSI channel may be allocated to a first subframe of a superframe. The first frequency channel may be a Single Frequency Network (SFN) and the second frequency channel may be encoded into a burst different from a burst of the first frequency channel. The NCI channel may be a primary broadcast channel and the CSI channel may be a secondary broadcast channel. The synchronization channel may include a primary synchronization channel and a secondary synchronization channel.

The CSI may be transmitted at a position different from a position of CSI of a neighbor BS in at least one of time and frequency in a subframe.

In another aspect of the present invention, a method for transmitting system information in a wireless access system includes transmitting an NCI channel including network common system information to an MS, transmitting a synchronization channel to the MS, for synchronization with a BS, and transmitting to the MS a CSI channel including cell specific system information which is specific to the BS. The NCI channel may be transmitted over a first frequency channel and the CSI channel is transmitted over a second frequency channel.

The NCI channel, the synchronization channel, and the CSI channel may be allocated to a first subframe of a superframe. The first frequency channel may be an SFN and the second frequency channel may be encoded into a burst different from a burst of the first frequency channel. The NCI channel may be a primary broadcast channel and the CSI channel is a secondary broadcast channel. The synchronization channel may include a primary synchronization channel and a secondary synchronization channel.

The CSI may be transmitted at a position different from a position of CSI of a neighbor BS in at least one of time and frequency in a subframe.

DETAILED DESCRIPTION OF THE INVENTION

Figure 1:
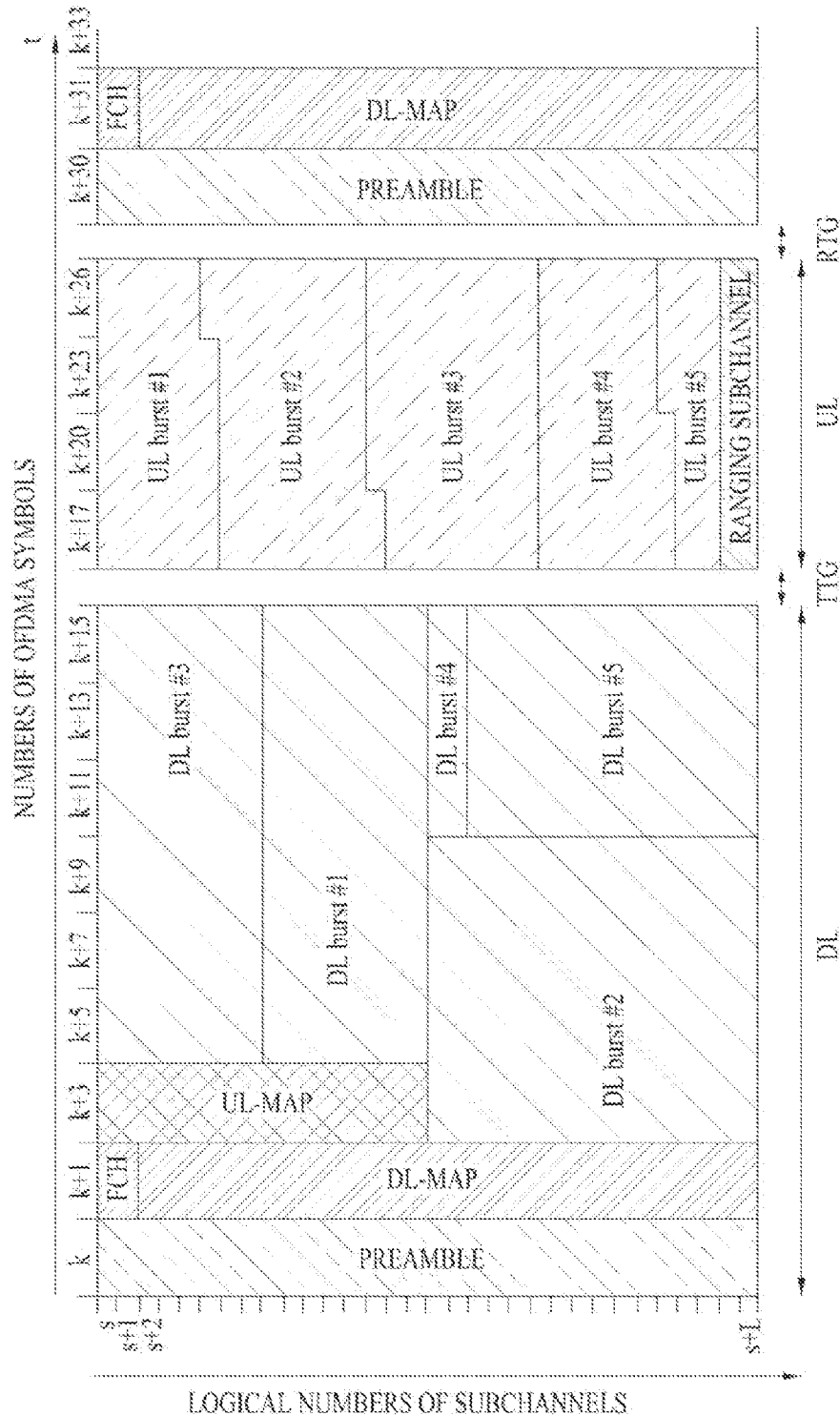
FIG. 1 illustrates a frame structure used in a broadband wireless access system (e.g. Institute of Electrical and Electronics Engineers (IEEE) 802.16).

The present invention relates to a wireless access system, and more particularly, to various methods for transmitting system information, various subframe structures, and various pilot structures. The present invention also relates to a method for transmitting system information through a Single Frequency Network (SFN).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment or may be replaced with corresponding constructions of another embodiment.

In the description of the drawings, procedures or steps that may obscure the subject matter of the present invention are not described. Procedures or steps that may be understood to those skilled in the art are not described either.

In the embodiments of the present invention, a description is made of a data transmission and reception relationship between a Base Station (BS) and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', etc. The term used herein 'MS' may be replaced with the term 'User Equipment (UE)', 'Subscriber Station (SS)', 'Mobile Subscriber Station (MSS)', 'mobile terminal, 'terminal', etc.

A transmitter means a fixed and/or mobile node that provides voice or data service and a receiver means a fixed and/or mobile node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

Smart phones combine the functions of both mobile phones and PDAs, for example, scheduling and data communications such as fax transmission and reception and Internet connection. The MB-MM terminal refers to a terminal which has a multi-modem chip therein and which can operate in any of a mobile Internet system and other mobile communication systems (e.g. Code Division Multiple Access 2000 (CDMA 2000), WCDMA, etc.)

Embodiments of the present invention may be achieved by various means, for example, hardware, firmware, software, or a combination thereof.

In a hardware configuration, methods according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing functions or operations as set forth herein. Software code may be stored in a memory unit and executed by a processor. The memory unit is located at the interior or exterior of the processor and may transmit and receive data to and from the processor via various known means.

The embodiments of the present invention may be supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terms used in the embodiments of the present invention may be explained by the standard documents. Especially the embodiments of the present invention may be supported by at least one of P802.16-2004, P802.16e-2005 or P802.16Rev2 documents which are the standards of IEEE 802.16.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to help the understanding of the present invention. These specific terms may be replaced with other terms within the scope and spirit of the present invention.

<Frame Structure>

Figure 2:
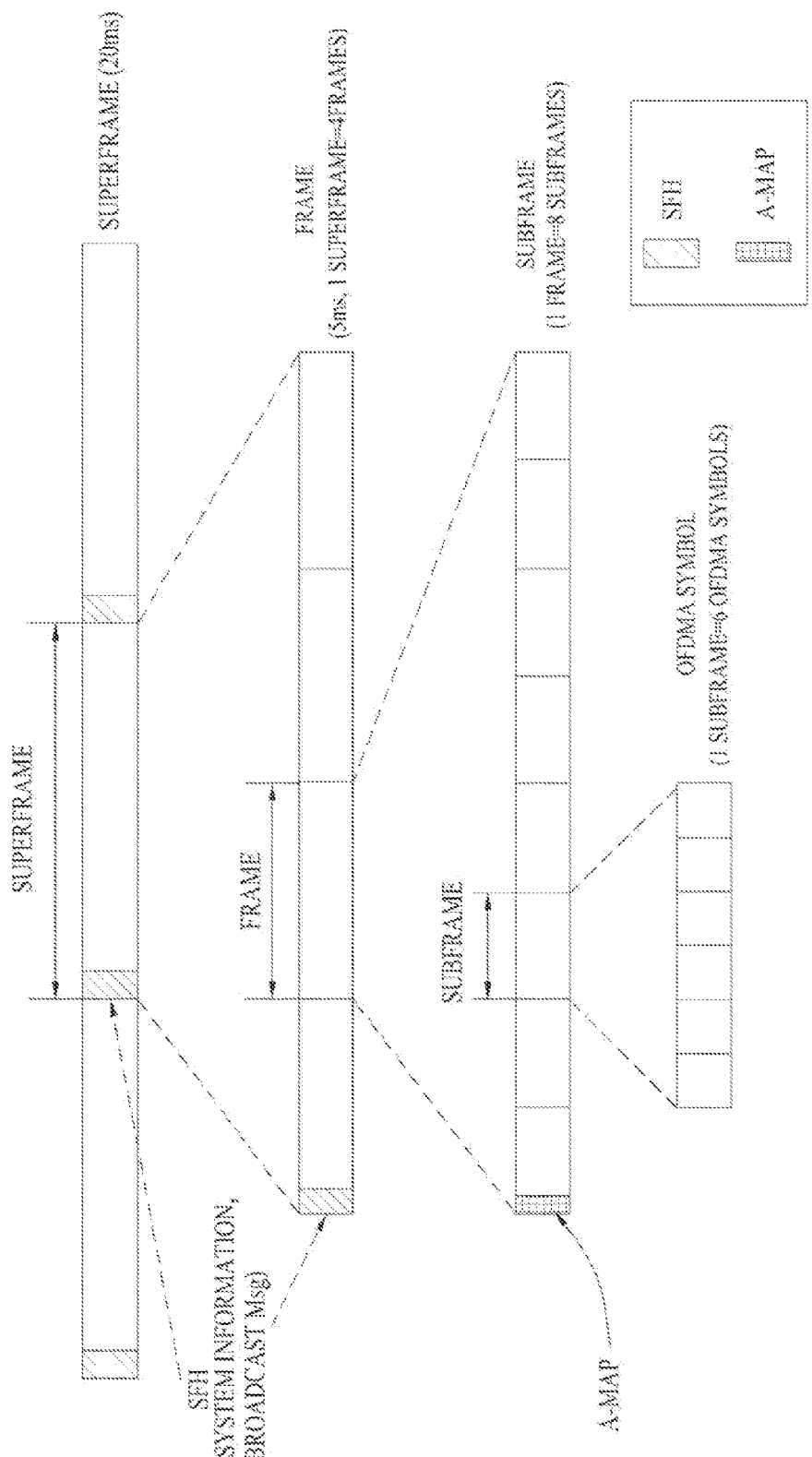
FIG. 2 illustrates a frame structure that can be used in embodiments of the present invention.

FIG. 2 illustrates a frame structure that can be used in embodiments of the present invention.

Referring to FIG. 2, a superframe includes one or more frames, each frame having one or more subframes. A subframe may include one or more Orthogonal Frequency Division Multiple Access (OFDMA) symbols.

The lengths and numbers of superframes, subframes and symbols may be adjusted according to user requirements or system environments. The term 'subframe' used in the embodiments of the present invention refers to any lower-layer frame structure created by segmenting one frame to a predetermined length.

A subframe structure used in embodiments of the present invention may be obtained by dividing a typical frame into one or more subframes. The number of subframes included in a frame may be determined according to the number of symbols per subframe. For instance, it is assumed that a frame includes 48 symbols. If a subframe includes 6 symbols, a frame may include 8 subframes. If a subframe includes 12 symbols, a frame may include 4 subframes.

It is assumed in FIG. 2 that a superframe is 20 ms long and a frame is 5 ms long. That is, a superframe may include 4 frames and a frame includes 8 subframes. Herein, a subframe may include 6 OFDMA symbols.

In FIG. 2, a SuperFrame Header (SFH) resides at the start of each superframe. The SFH may be referred to as a super-MAP or a superframe MAP. A subframe MAP may be positioned at the start of a subframe. The subframe MAP may be referred to as a sub-MAP or Advanced MAP (A-MAP). An A-MAP may exist in each subframe or a predetermined subframe.

<Methods for Transmitting System Information>

In accordance with embodiments of the present invention, an SFN is used. An SFN refers to a broadcast network over which a plurality of transmitters transmit the same signal simultaneously on the same frequency channel. The SFN may be used to transmit a broadcast channel such as a TV or radio channel.

For example, if adjacent BSs transmit the same broadcast information on the same radio channel at the same time during TV or radio broadcasting then noise between BSs may be reduced because transmission of the same information is able to be performed on the same channel at the same time. Therefore, broadcast signals from the BSs may be transmitted reliably to MSs. That is, an SFN advantageously enables a BS to transmit a broadcast signal with less power or resources.

BSs may transmit system information to MSs over an SFN. In an IEEE 802.16e system, BSs transmit System Information (SI) to MSs at their scheduled times in a Downlink Channel Descriptor (DCD)/Uplink Channel Descriptor (UCD).

If the SI includes information having the same value for BSs within the network (e.g. an operator IDentifier (ID), frame numbers, a bandwidth, a frequency, etc.) and this information is transmitted through the SFN, the information may be transmitted at a higher Modulation and Coding Scheme (MCS) level than is done conventionally. Accordingly, radio resources may be conserved and channel noise may be reduced in transmitting SI.

SI may be classified into Network Common Information (NCI) and Cell Specific Information (CSI) in the embodiments of the present invention.

The NCI is network-wide common and static information and the CSI is variable information specific to a particular cell.

The NCI may include a frame number, a system bandwidth, a DL/UL ratio, etc. The CSI may include an antenna number, a Cyclic Prefix (CP) size, subframe grouping information, etc.

Figure 3:
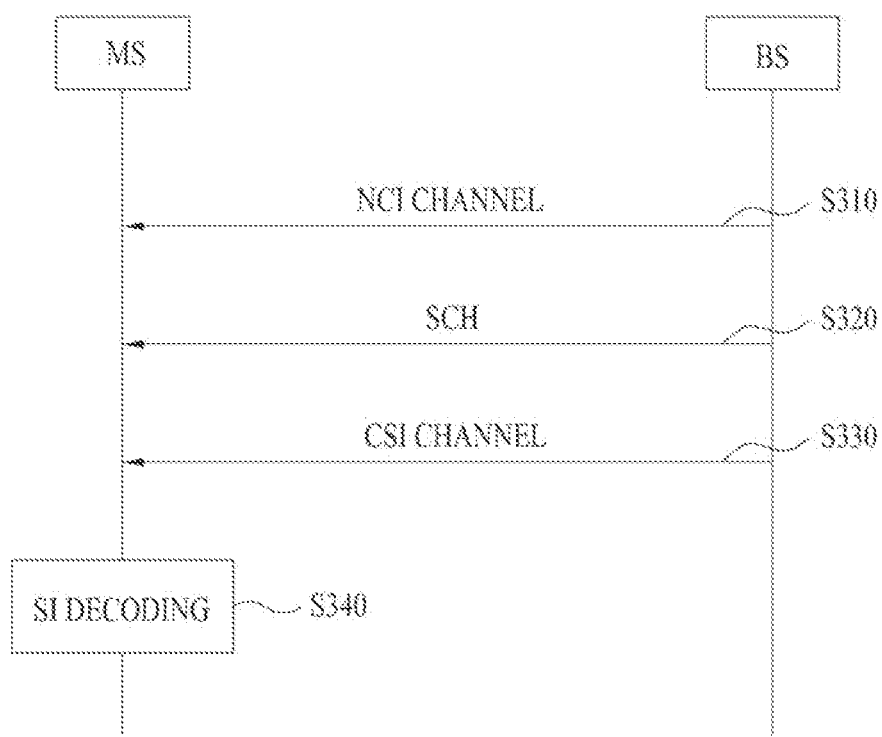
FIG. 3 is a diagram illustrating a signal flow for one of methods for transmitting system information according to an embodiment of the present invention.

FIG. 3 is a diagram illustrating a signal flow for one of methods for transmitting SI according to an embodiment of the present invention.

Referring to FIG. 3, a BS may transmit an NCI channel carrying NCI to an MS over an SFN (S310).

The BS may transmit a Synchronization Channel (SCH) to the MS, for synchronization with the MS (S320).

The BS may transmit a CSI channel carrying CSI being information specific to its cell area to the MS. Specifically, the BS may transmit the CSI channel in a more robust MCS than the NCI at a position set by the BS, without using the SFN (S330).

In step S330, the BS may encode the CSI channel into a different burst from a burst of the NCI channel and transmit the encoded CSI channel to the MS on a different frequency and/or time channel.

To reduce Inter-Cell Interference (ICI), the BS may transmit the CSI channel by segmenting the CSI channel into frequency or time units for cells or sectors. That is, BSs may set different CSI transmission positions for adjacent cells on time and frequency axes.

For segmenting the CSI channel at the BS, a Frequency Segment Method (FSM), a Time Segment Method (TSM), and a Hybrid Segment Method (HSM) are available.

CSI transmission positions are set for adjacent cells on the frequency axis in the FSM and on the time axis (e.g. in units of symbols) in the TSM. According to the HSM, the CSI channel is divided on the time and frequency axes, radio resources for cell areas with non-overlapped segments are allocated to respective cells, and accordingly, each cell transmits CSI to MSs in its allocated radio resources. For example, permutation may be performed at a subcarrier or mini-block level.

The MS may decode the NCI channel and the CSI channel using the SCH (S340).

In order to increase the channel estimation performance of the CSI channel, the BS may transmit the CSI channel in a specific pilot structure. Hence, the MS may decode the SI using the SCH and pilot signals in step S340.

Figure 4:
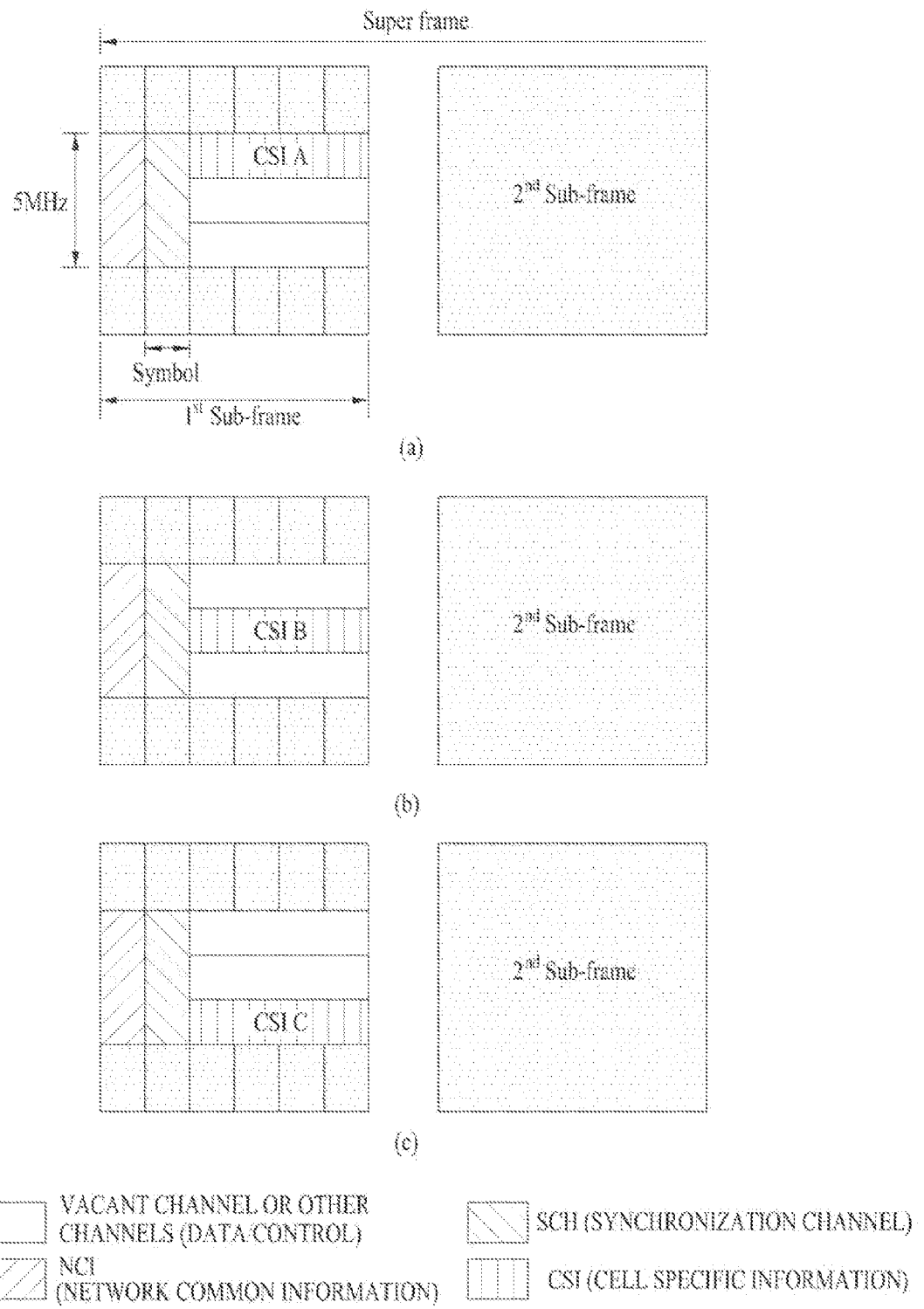
FIG. 4 illustrates one of methods for transmitting Cell Specific Information (CSI) in a Frequency Segment Method (FSM) according to an embodiment of the present invention.

FIG. 4 illustrates one of methods for transmitting CSI in the FSM according to an embodiment of the present invention.

Referring to FIG. 4, an NCI channel carries NCI and an SCI channel carries CSI. An SCH delivers synchronization information for synchronizing between a BS and an MS (e.g. a preamble, etc.). The remaining subframe region may be used for a vacant channel, a data channel or a control channel.

FIGS. 4(a), 4(b) and 4(c) illustrate subframe structures used in Cell A, Cell B and Cell C, respectively. It is assumed that Cell A, Cell B and Cell C are the cell areas of adjacent BSs.

In FIG. 4, NCI is transmitted in the first symbol of the first subframe to MSs through a 5-MHz SFN. Cell A, Cell B and Cell C may transmit the NCI to MSs using the same SFN.

A 5-MHz SCH carrying a preamble may follow the NCI. The SCH may contain channel estimation information for use in decoding the NCI.

A BS may transmit CSI to an MS in the other DL symbols following the SCH. The first subframe of a specific superframe may include 6 OFDMA symbols. As described above, the first and second symbols of the first subframe are allocated to the NCI and the SCH, respectively. The remaining 4 symbols may be divided into 3 segments along the frequency axis.

The CSI may be transmitted in the other DL symbols following the SCH, divided into 3 segments along the frequency axis. Cell A may transmit SI specific to Cell A, CSI A to MSs in a first segment, Cell B may transmit SI specific to Cell B, CSI B to MSs in a second segment, and Cell C may transmit SI specific to Cell C, CSI C to MSs in a third segment.

Figure 5:
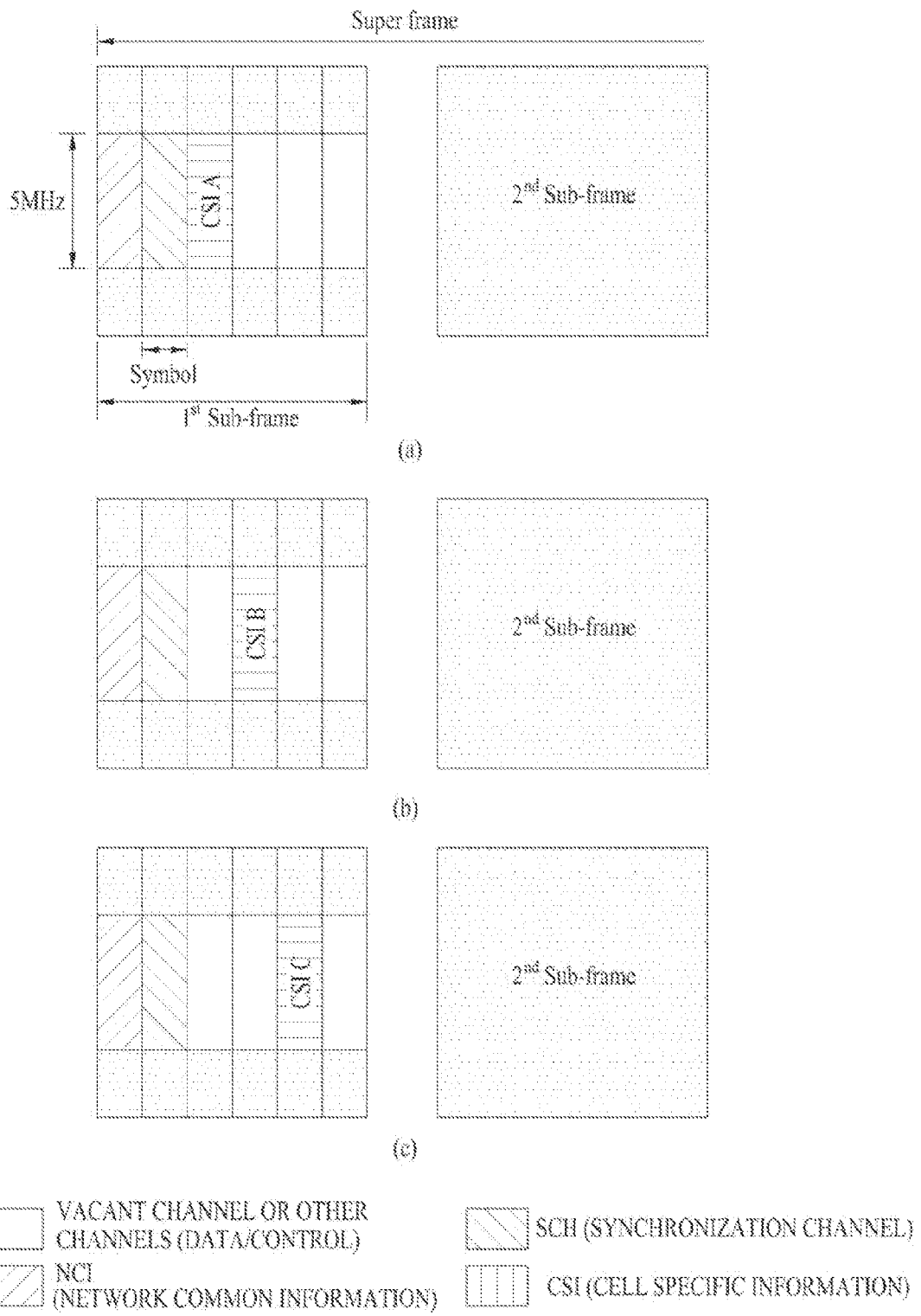
FIG. 5 illustrates one of methods for transmitting CSI in a Time Segment Method (TSM) according to an embodiment of the present invention.

FIG. 5 illustrates one of methods for transmitting CSI in a TSM according to an embodiment of the present invention.

Referring to FIG. 5, an NCI channel carries NCI and an SCI channel carries CSI. An SCH delivers synchronization information for synchronizing between a BS and an MS (e.g. a preamble, etc.). The remaining subframe region may be used for a vacant channel, a data channel or a control channel.

FIGS. 5(a), 5(b) and 5(c) illustrate subframe structures used in Cell A, Cell B and Cell C, respectively. It is assumed that Cell A, Cell B and Cell C are the cell areas of adjacent BSs.

In FIG. 5, NCI is transmitted in the first symbol of the first subframe to MSs through a 5-MHz SFN. Cell A, Cell B and Cell C may transmit the NCI to MSs using the same SFN.

A 5-MHz SCH carrying a preamble may follow the NCI. The SCH may contain channel estimation information for use in decoding the NCI.

A BS may transmit CSI to an MS in the other DL symbols following the SCH. The first subframe of a specific superframe may include 6 OFDMA symbols. As described above, the first and second symbols of the first subframe are allocated to the NCI and the SCH, respectively. The remaining 4 symbols may be divided into 4 segments for each cell to transmit CSI to an MS.

In FIG. 5, Cell A may transmit SI specific to Cell A, CSI A to MSs in a first segment, Cell B may transmit SI specific to Cell B, CSI B to MSs in a second segment, and Cell C may transmit SI specific to Cell C, CSI C to MSs in a third segment. The last segment, that is, a fourth segment may be used to transmit other data or control information.

Figure 6:
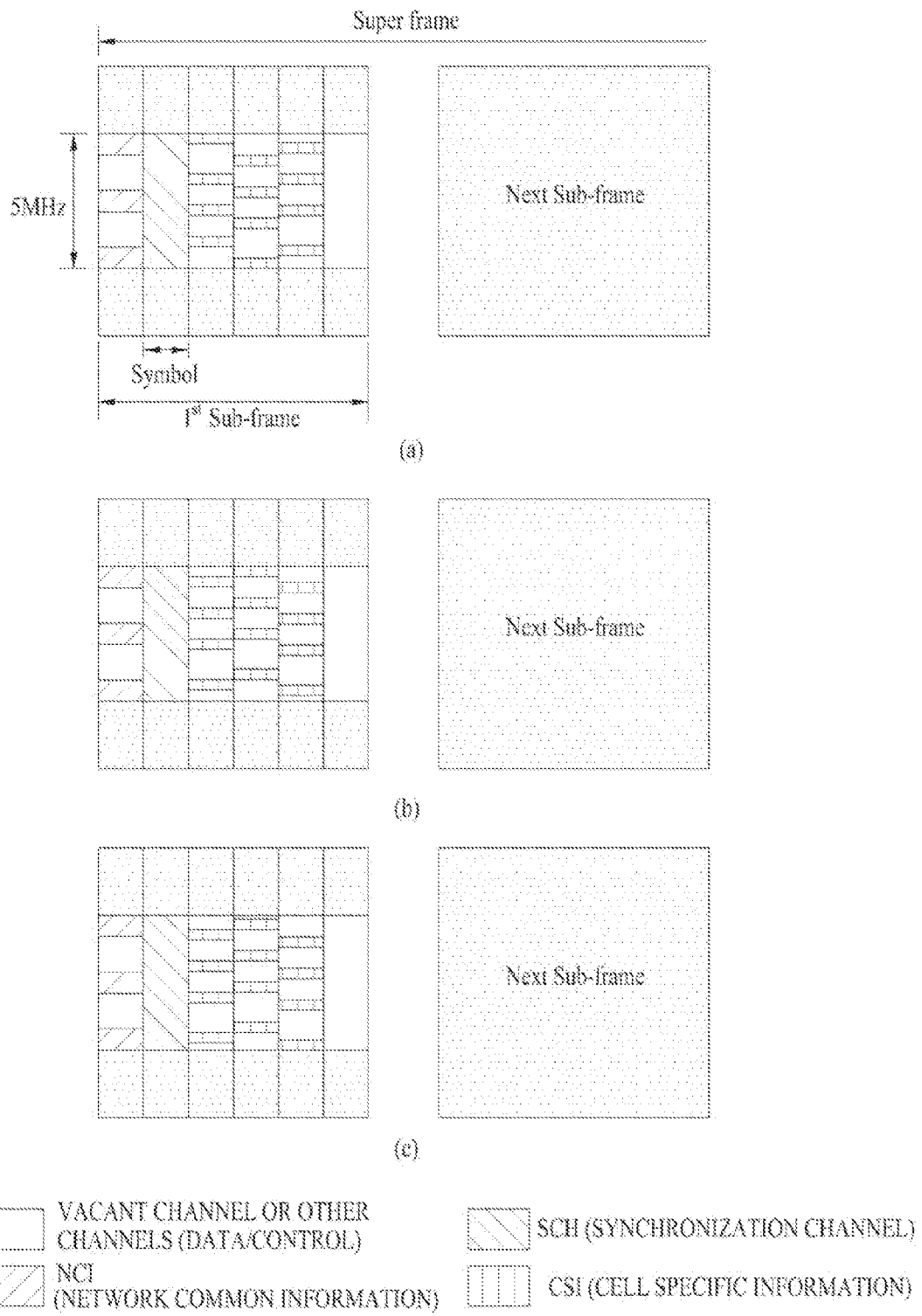
FIG. 6 illustrates one of methods for transmitting CSI in a Hybrid Segment Method (HSM) according to an embodiment of the present invention.

FIG. 6 illustrates one of methods for transmitting CSI in an HSM according to an embodiment of the present invention.

Referring to FIG. 6, an NCI channel carries NCI and an SCI channel carries CSI. An SCH delivers synchronization information for synchronizing between a BS and an MS (e.g. a preamble, etc.). The remaining subframe region may be used for a vacant channel, a data channel or a control channel.

FIGS. 6(a), 6(b) and 6(c) illustrate subframe structures used in Cell A, Cell B and Cell C, respectively. It is assumed that Cell A, Cell B and Cell C are the cell areas of adjacent BSs.

In FIG. 6, NCI is transmitted in the first symbol of the first subframe to MSs through a 5-MHz SFN. Cell A, Cell B and Cell C may transmit the NCI to MSs using the same SFN.

A 5-MHz SCH carrying a preamble may follow the NCI. The SCH may contain channel estimation information for use in decoding the NCI.

A BS may transmit CSI to an MS in the other DL symbols following the SCH. The first subframe of a specific superframe may include 6 OFDMA symbols. As described above, the first and second symbols of the first subframe are allocated to the NCI and the SCH, respectively. The remaining 4 symbols may deliver CSI to each cell area according to the HSM. That is, 3 OFDMA symbols to which the HSM is applied may be divided into 3 segments as illustrated in FIG. 6. Cell A may transmit SI specific to Cell A, CSI A to MSs in a CSI channel region configured as illustrated in FIG. 6(a), Cell B may transmit SI specific to Cell B, CSI B to MSs in a CSI channel region configured as illustrated in FIG. 6(b), and Cell C may transmit SI specific to Cell C, CSI C to MSs in a CSI channel region configured as illustrated in FIG. 6(c).

Cell A, Cell B and Cell C are the cell areas of adjacent BSs. If Cell A, Cell B and Cell C transmit CSI at the same position on the frequency axis and/or time axis, the CSI may cause mutual interference. Accordingly, ICI can be minimized by changing the position of a CSI channel region for each cell in a predetermined time order and/or frequency change.

Decoding of NCI and CSI and Channel Estimation

As illustrated in FIGS. 4, 5 and 6, when NCI, CSI and an SCH (or a preamble) are positioned in adjacent symbols, the SCH may be used for decoding of the NCI and the CSI (or channel estimation). That is, when the SCH is used for channel estimation, an NCI channel or a CSI channel may be estimated without using a pilot signal, or even when it includes fewer pilots than a channel (or subframe) that does not include an SCH.

If the NCI and/or CSI are transmitted on Broadcast Channels (BCHs), the SCH may be used for channel estimation or for decoding the BCHs by positioning the SCH between the BCHs.

CSI Segment Methods

When CSI is segmented for adjacent cells, the position of each CSI segment may be indicated by an SCH.

In a method for indicating CSI segments by an SCH, a BS may distinguish the CSI segments from one another by increasing the number of SCH sequences. That is, the BS may use a different SCH sequence (or preamble sequence) for each CSI segment. For instance, the BS may use three different SCH sequences for three CSI segments.

In another method, the BS may circularly shift an SCH sequence to indicate each CSI segment. For example, the BS may circularly shift one SCH sequence to thereby create three SCH sequences for three CSI segments.

In a third method, an MS may acquire CSI through blind decoding of CSI segments. For instance, the BS allocates CSI A, CSI B and CSI C to three segment areas and the MS may acquire CSI by blind decoding of the three areas.

Pilot Structures for CSI

The position and structure of a pilot signal allocated to CSI are determined by each segment. That is, the pilot signal may differ in position and structure for different segments. To determine the positions of pilot signals for segments, the position of a pilot signal may be shifted for each segment. The shift may be a cyclic shift.

The cyclic shift of a pilot signal is to shift each pilot signal by a predetermined size on the time or frequency axis. If the cyclic shift takes place on the frequency axis, the pilot signal is preferably shifted by units of two subcarriers. Obviously, the cyclic shift may be performed by units of one, three, four, or more subcarriers.

In accordance with embodiments of the present invention, the cyclic shift of a pilot signal may be confined to a specific area. For example, a pilot signal may be cyclically shifted only in a CSI region or in all segments to which CSI can be allocated within the size of an SFH (e.g. 5 MHz).

Pilot signals may be shifted in any other manner than cyclic shift in embodiments of the present invention. For example, pilot patterns are preset and a different pilot pattern may be used for each segment.

<SCH Structures>

The BS may allocate an SCH sequence only to odd-numbered or even-numbered subcarriers in order to create a pattern repeated on the time domain. The MS may decode NCI using the SCH. Herein, the SCH may include segment identification information (e.g. a segment group ID-1, 2 or 3).

The SCH (or preamble) is configured so that a predetermined SCH sequence (or preamble sequence) is repeated. The SCH is transmitted in a kind of multiple antenna technique, Cyclic Delay Diversity (CDD), or a single antenna technique.

A first BCH (BCH 1) carrying NCI may be transmitted in an SFN-Single Input Multiple Output (SFN-SIMO) scheme or an SFN-Space Frequency Block Coding (SFN-SFBC) scheme. A second BCH (BCH 2) carrying CSI may be transmitted in SFBC or CDD. The size (N bits) of a cell ID is transmitted to an MS in a preamble (or on a BCH).

The MS acquires timing synchronization with the BS and estimates a frequency offset using the repeated SCH and then detects a cell ID.

A pilot signal may be shifted on the frequency axis for each cell ID. To avoid ICI, BCH 2 may be segmented for cell IDs.

In accordance with embodiments of the present invention, BCH 1 may be referred to as a Primary BCH (PBCH) and BCH 2 may be referred to as a Secondary BCH (SBCH). In addition, a Resource Block (RB) may be referred to as a Resource Unit (RU).

Hereinbelow, a description will be given of a subframe structure to which the afore-described method for transmitting SI, method for decoding NCI and CSI and channel estimation, CSI segment method, and pilot and SCH (or preamble) structures for CSI are applied.

Figure 7:
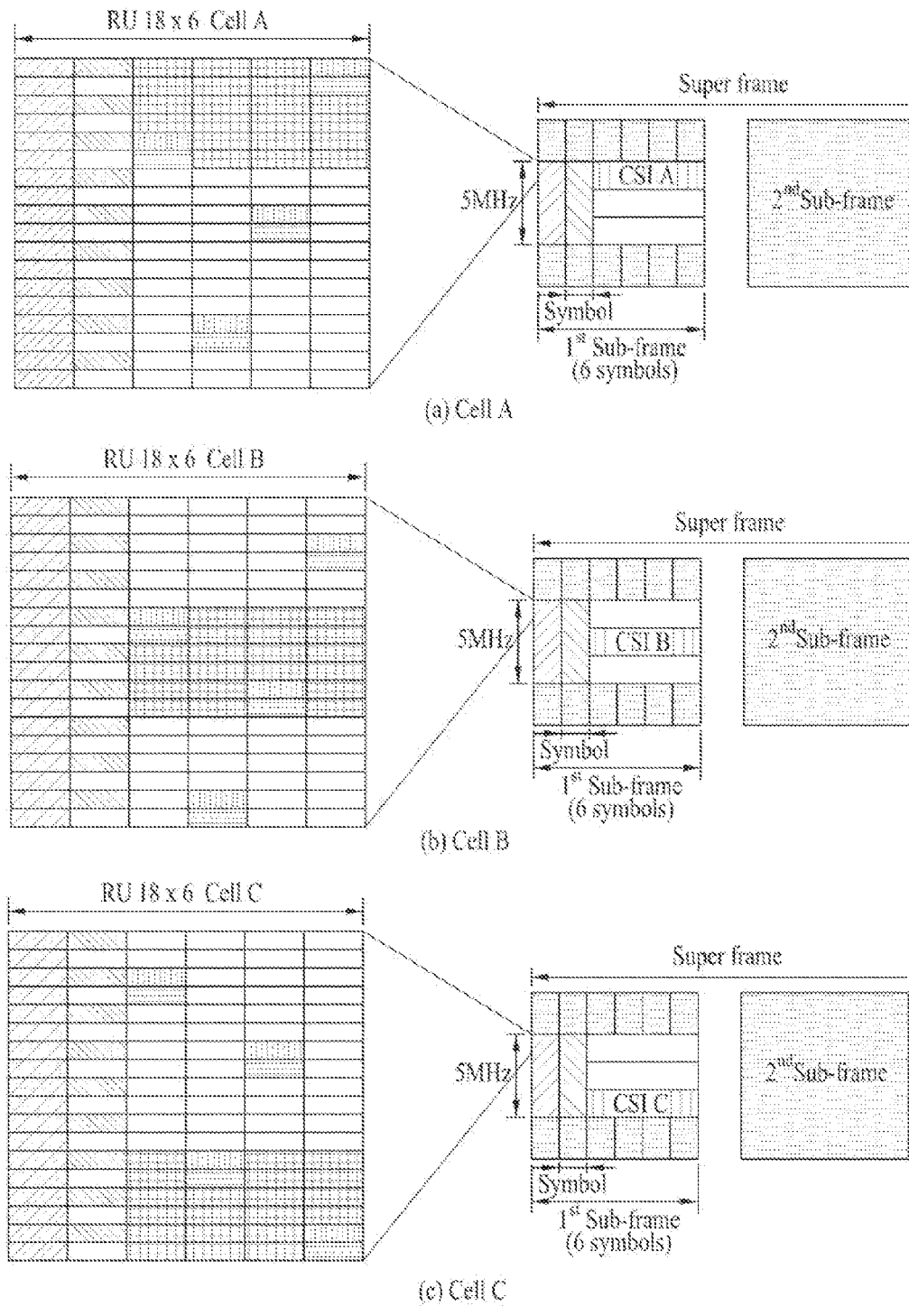
FIG. 7 illustrates an exemplary pilot structure for CSI channel transmission according to another embodiment of the present invention.

FIG. 7 illustrates an exemplary pilot structure for CSI channel transmission according to another embodiment of the present invention.

FIGS. 7(a), 7(b) and 7(c) illustrate structures of the first subframe of a superframe for use in the cell areas of adjacent BSs. In FIG. 7, it is assumed that NCI is transmitted to MSs on BCH 1 and CSI is transmitted to MSs on BCH 2. It is also assumed that a BS and an MS each use two Transmission (Tx) and Reception (Rx) antennas.

To describe the pilot structures illustrated in FIG. 7 in detail, RBs of the first subframe shown in FIG. 7 as enlarged will be described. One RB may include 18 subcarriers by 6 OFDMA symbols.

Referring to FIG. 7(a), BCH 1 may be allocated to a first OFDMA symbol, a preamble (or an SCH) may be allocated to a second OFDMA symbol, and BCH 2 may be allocated to third to sixth OFDMA symbols. The preamble may be segmented and allocated to odd-numbered or even-numbered subcarriers.

In FIGS. 7(b) and 7(c), no pilot signal is allocated to BCH 1 carrying NCI and the preamble, whereas a pilot signal is allocated to BCH 2 carrying CSI. Therefore, pilot signals allocated to BCH 2 occupying the third to sixth OFDMA symbols are cyclically shifted. The pilot structures of FIGS. 7(b) and 7(c) are obtained by cyclically shifting the pilot structure of FIG. 7(a) along the frequency axis by units of two subcarriers.

Figure 8:
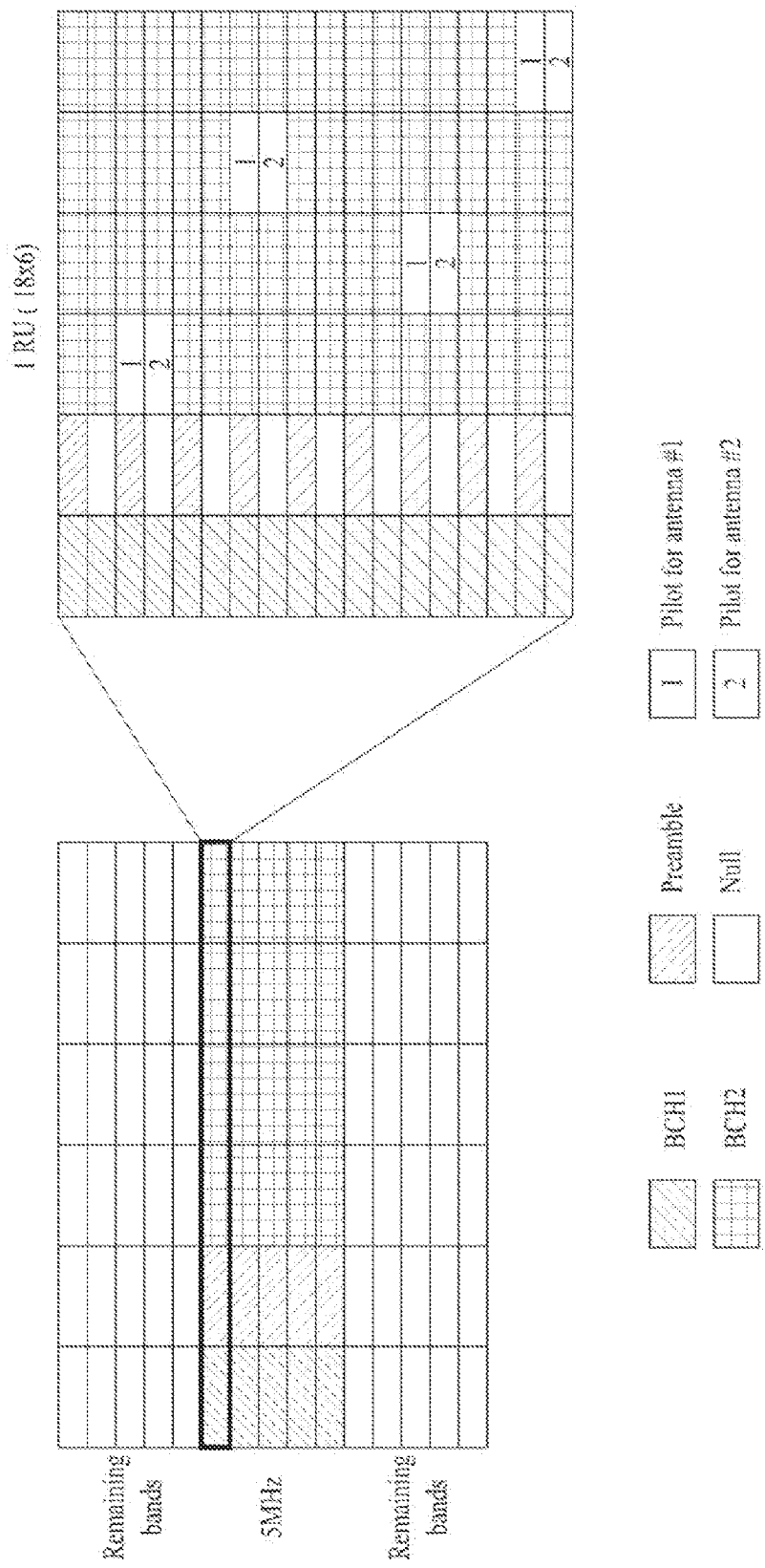
FIG. 8 illustrates an exemplary subframe structure for CSI channel transmission according to an embodiment of the present invention.

FIG. 8 illustrates another exemplary subframe structure for CSI channel transmission according to another embodiment of the present invention.

In FIG. 8, a subframe structure used in the cell area of a specific BS is illustrated. One subframe may include 15 subchannels by 6 OFDMA symbols. One RB may have 18 subcarriers by 6 OFDMA symbols.

Referring to FIG. 8, BCH 1 is allocated to a first symbol, a preamble is allocated to a second symbol, and BCH 2 is allocated to the remaining symbols. NSI is transmitted on BCH 1 and CSI is transmitted on BCH 2. The NSI may be channel-estimated or decoded using the preamble. For channel estimation and reliable decoding of the CSI, pilot symbols may be allocated on an antenna basis.

Figure 9:
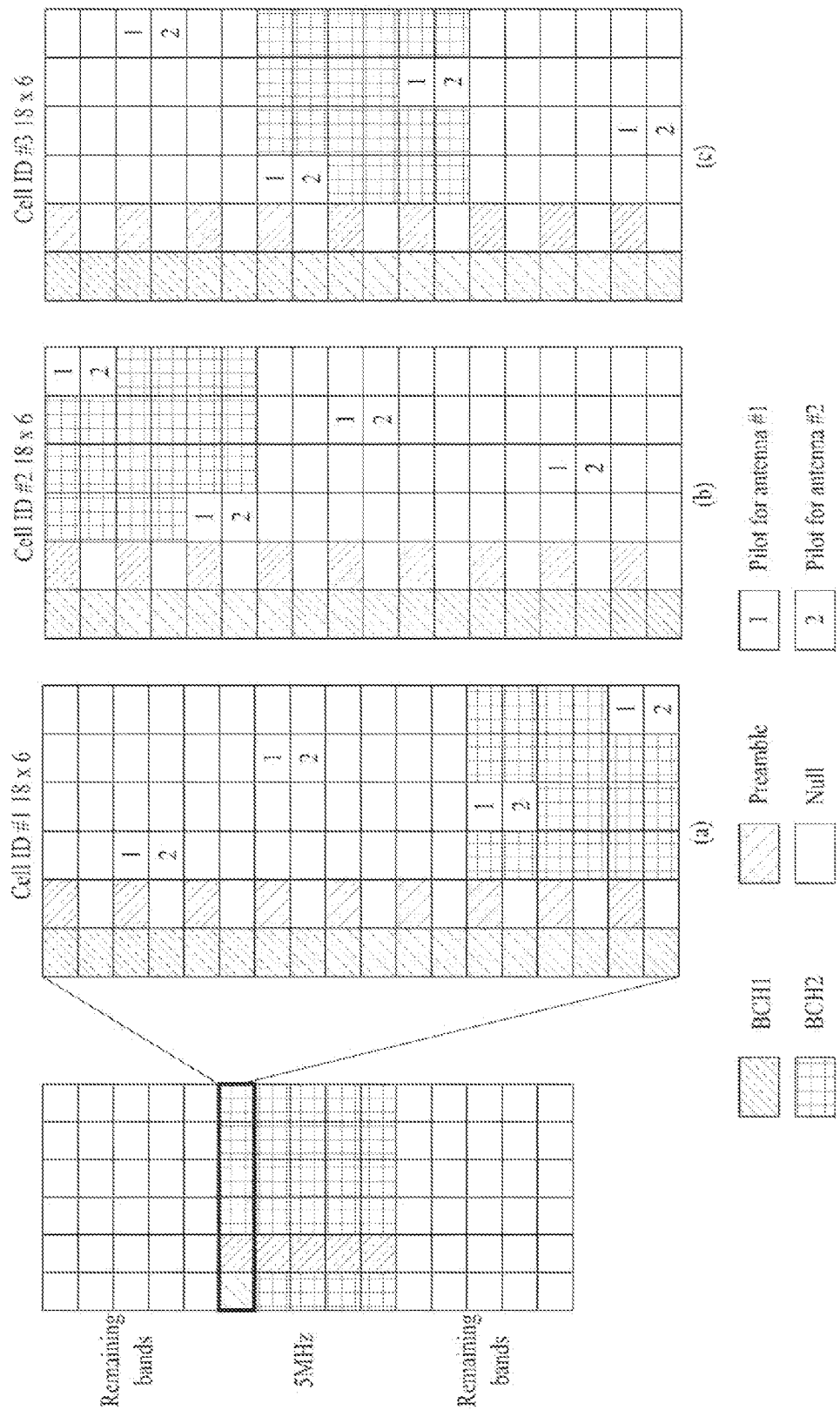
FIG. 9 illustrates another exemplary subframe structure for CSI channel transmission according to another embodiment of the present invention.

FIG. 9 illustrates another exemplary subframe structure for CSI channel transmission according to another embodiment of the present invention.

The subframe structure illustrated in FIG. 9 is basically identical to the subframe structure illustrated in FIG. 8, except that SCI is segmented and transmitted only in specific resource regions in order to reduce interference from neighbor BSs.

For instance, FIG. 9(a) illustrates an RB included in a subframe for Cell A (Cell ID #1), in which 6 subcarriers counted backward from the last subcarrier are used for CSI A. FIG. 9(b) illustrates an RB included in a subframe for Cell B (Cell ID #2), in which 6 subcarriers counted forward from the first subcarrier are used for CSI B. FIG. 9(c) illustrates an RB included in a subframe for Cell C (Cell ID #3), in which 6 subcarriers counted forward from the sixth subcarrier are used for CSI C.

That is, it is preferred to transmit CSI on different subcarriers in different cells in order to avoid ICI.

Figure 10:
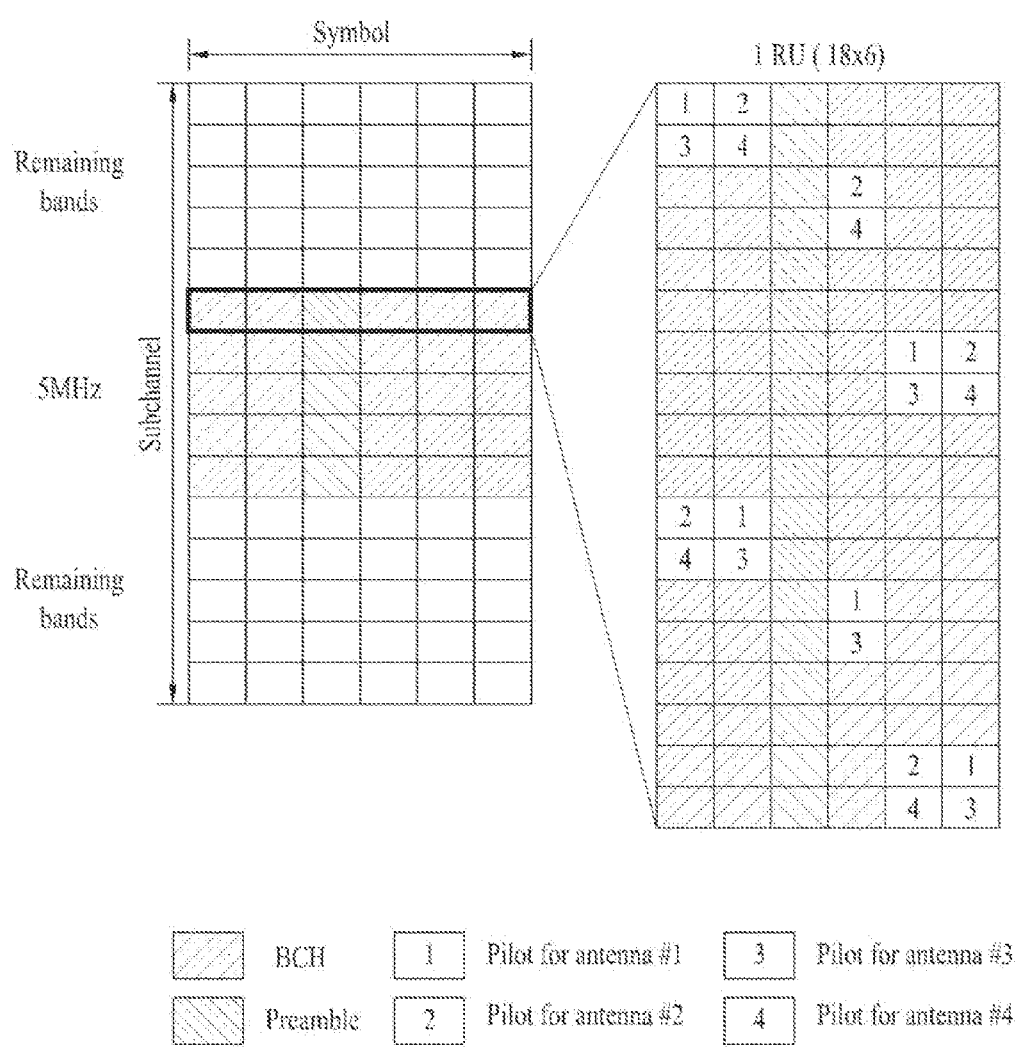
FIG. 10 illustrates one of methods for representing a preamble structure and a pilot structure according to another embodiment of the present invention.

FIG. 10 illustrates one of methods for representing a preamble structure and a pilot structure according to another embodiment of the present invention.

Referring to FIG. 10, one preamble (or SCH) is allocated to the first subframe of a superframe. Particularly, the preamble is allocated to the third OFDMA symbol of the first subframe. However, the preamble may be allocated to any symbol of a subframe. Pilot symbols for respective antennas may be allocated in OFDMA symbols to which BCHs are allocated, as illustrated in FIG. 10.

The preamble may be transmitted to an MS through a first antenna (Ant #k1) of a BS. To achieve diversity independently of the preamble, a BCH may be transmitted through two or four Tx antennas from the BS. An MS may detect the preamble through blind decoding.

Figure 11:
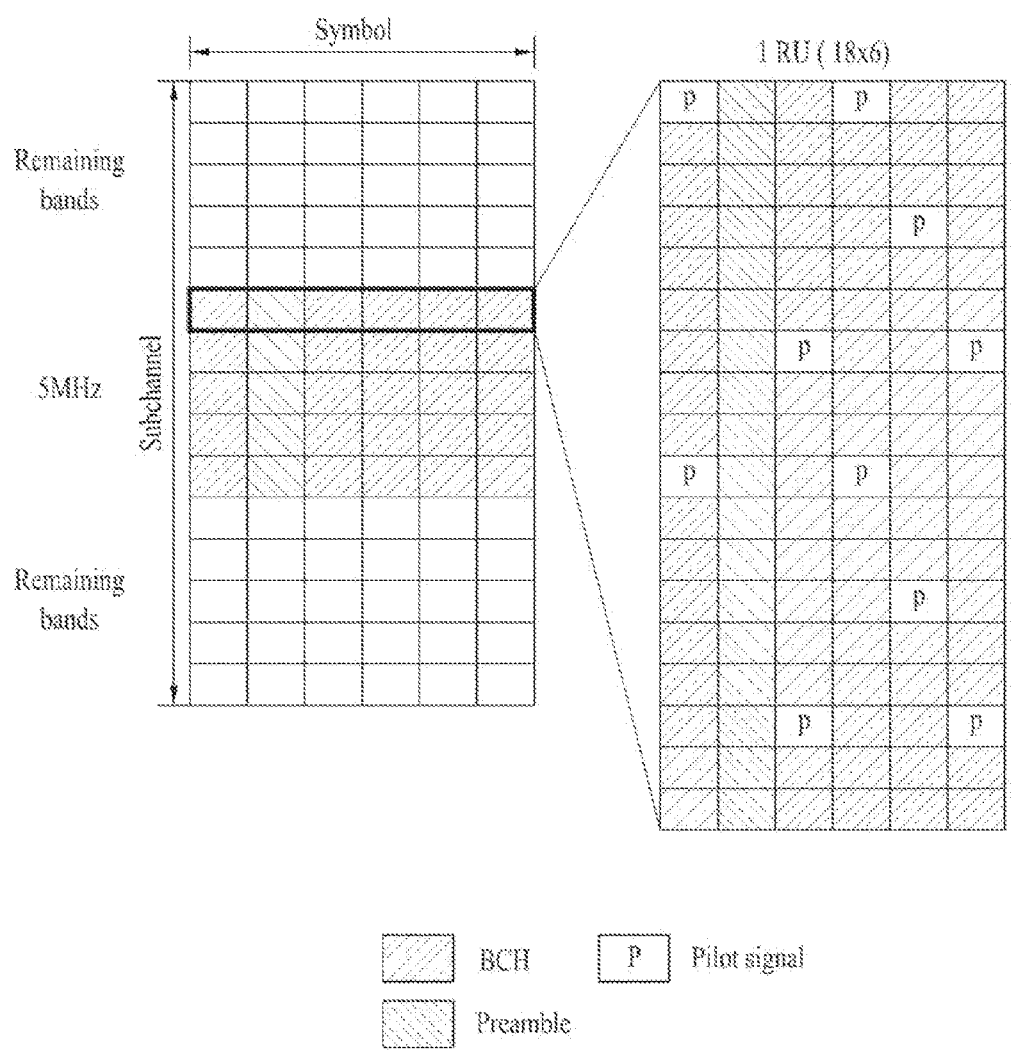
FIG. 11 illustrates another method for representing a preamble structure and a pilot structure according to the embodiment of the present invention.

FIG. 11 illustrates another method for representing a preamble structure and a pilot structure according to the embodiment of the present invention.

In the illustrated case of FIG. 11, one preamble is used. The preamble is allocated to a second OFDMA symbol and pilot symbols may be allocated to the remaining BCH region, for channel estimation. The BS may transmit the preamble to MSs in CDD. The BS may also transmit a BCH to MSs in CDD.

Figure 12:
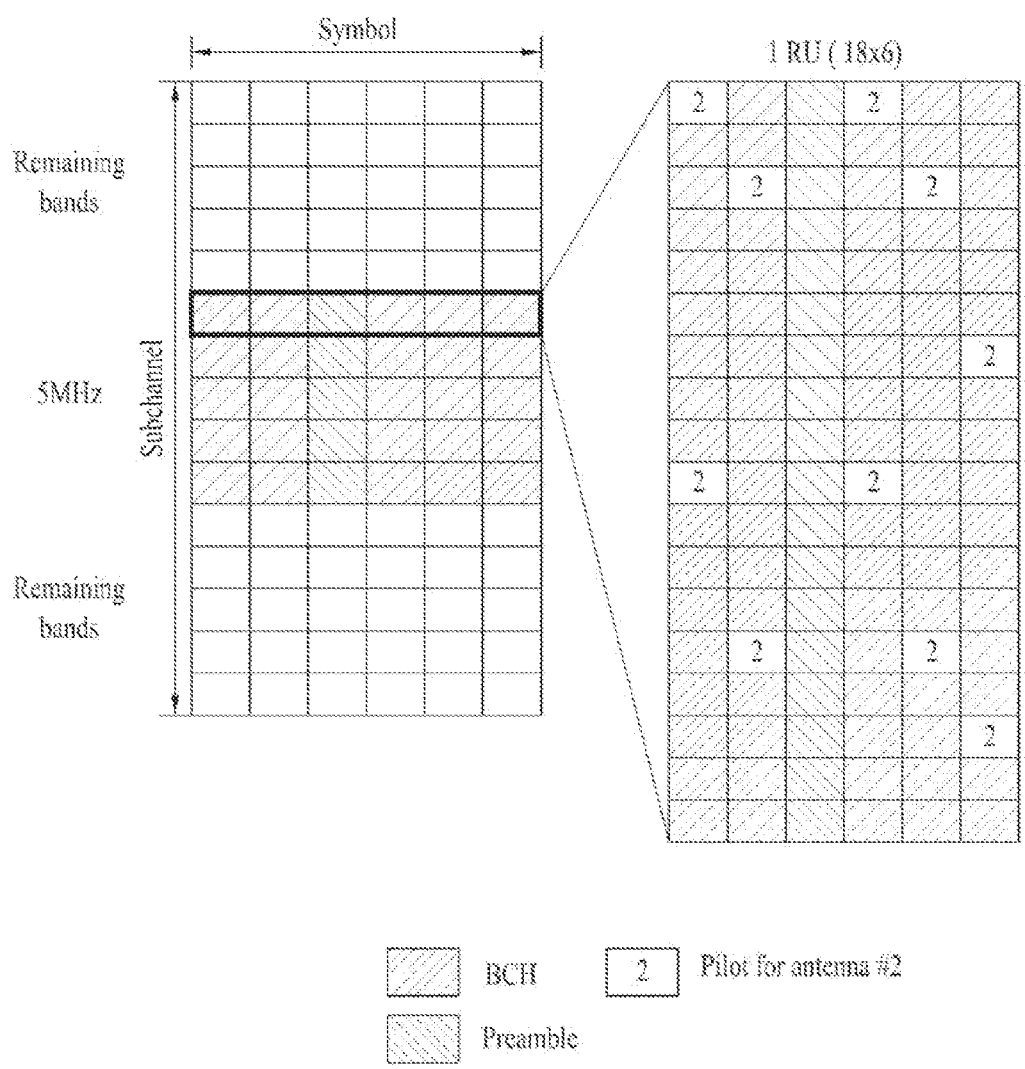
FIG. 12 illustrates another method for representing a preamble structure and a pilot structure according to the embodiment of the present invention.

FIG. 12 illustrates another method for representing a preamble structure and a pilot structure according to the embodiment of the present invention.

Referring to FIG. 12, one preamble is used and allocated to a third OFDMA symbol. The preamble is transmitted from the BS through the first antenna (Ant #k1) and a pilot signal (Pilot 2) is transmitted from the BS through a second antenna (Ant #2). In addition, a BCH is transmitted in SFBC. The BCH may be decoded using the preamble and pilot symbols.

Figure 13:
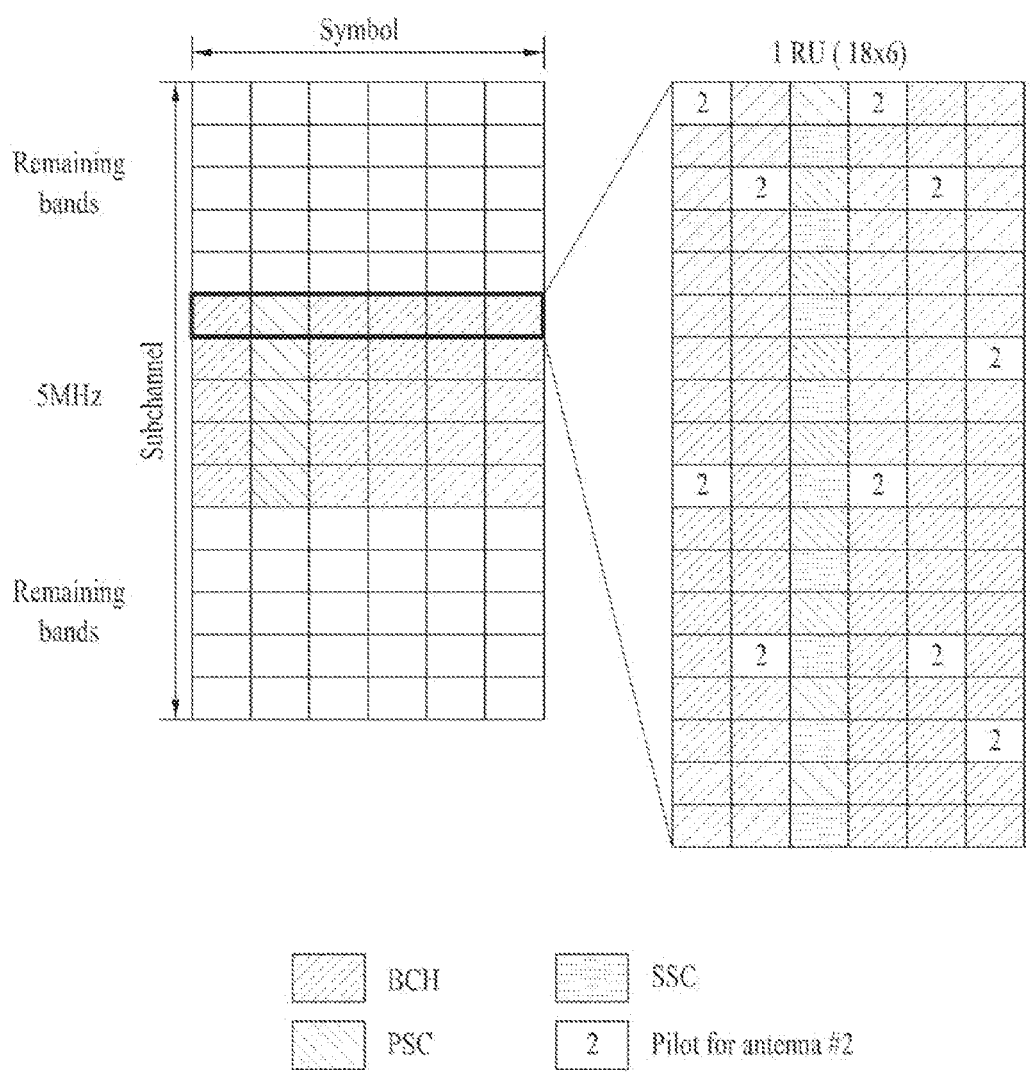
FIG. 13 illustrates another method for representing a preamble structure and a pilot structure according to the embodiment of the present invention.

FIG. 13 illustrates another method for representing a preamble structure and a pilot structure according to the embodiment of the present invention.

The subframe structure illustrated in FIG. 13 is almost the same as the subframe structure illustrated in FIG. 12, except that specific preamble sequences are repeated. Referring to FIG. 13, the preamble sequences may be divided into a Primary Synchronization Channel (PSC) and a Secondary Synchronization Channel (SSC).

The PSC may be used for acquiring synchronization and the SSC may be used to transmit information such as a cell ID other than synchronization information. The PSC may be allocated to even-numbered subcarriers and the SSC may be allocated to odd-numbered subcarriers. Needless to say, the PSC may be exchanged with the SSC in position, according to user requirements or system environments.

Referring to FIG. 13, the preamble sequences may be transmitted from the BS through the first antenna (Ant #k1) and a BCH may be transmitted from the BS through the first and second antennas (Ant #k1 and Ant #k2) in SFBC.

Figure 14:
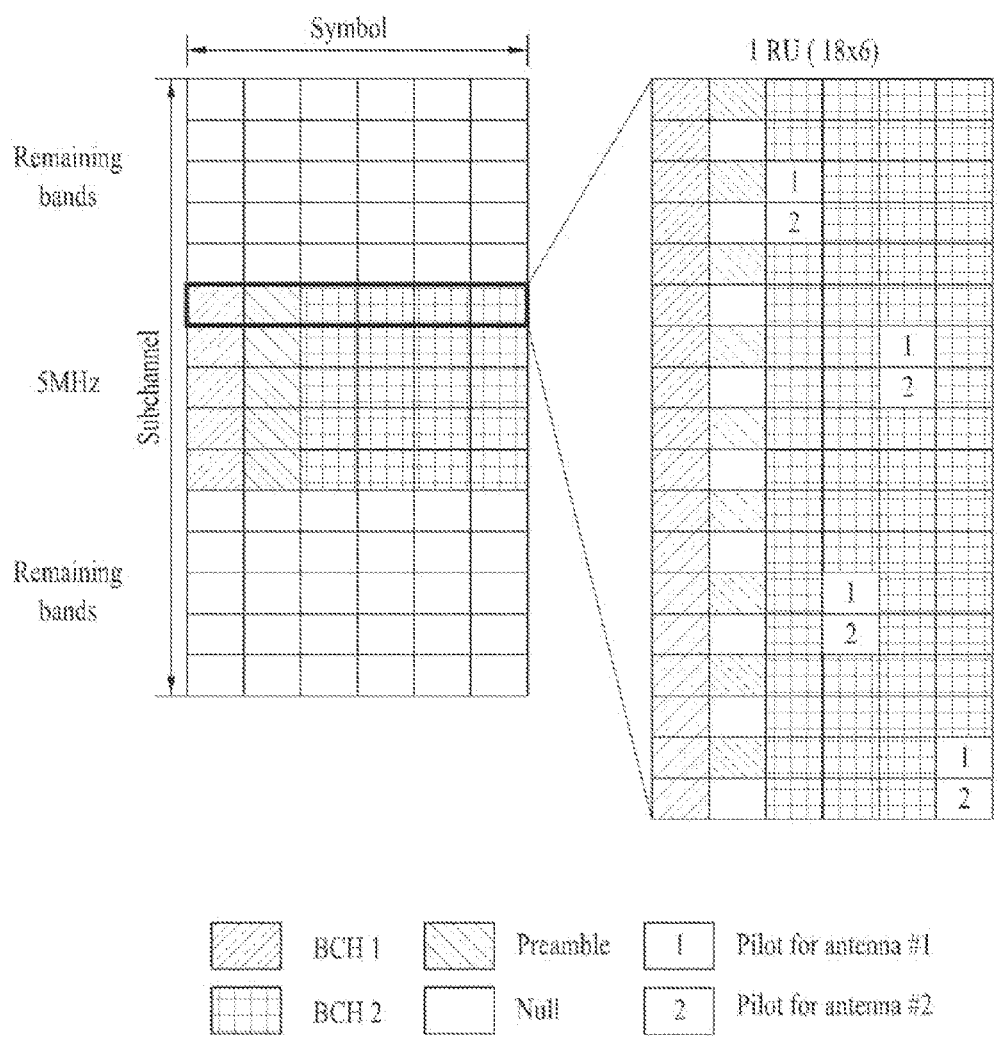
FIG. 14 illustrates another method for representing a preamble structure and a pilot structure according to the embodiment of the present invention.
Figure 15:
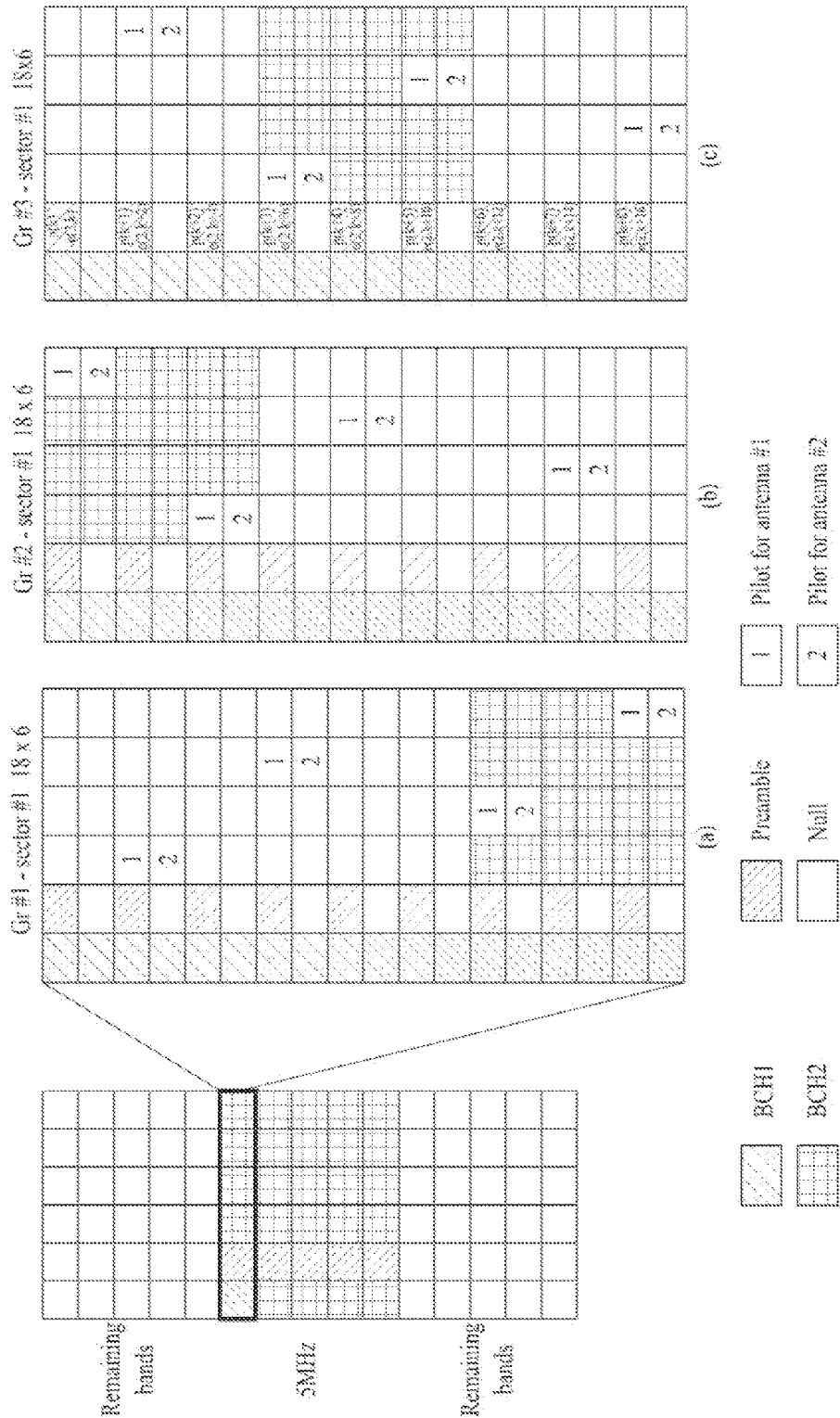
FIG. 15 illustrates another method for representing a preamble structure and a pilot structure according to the embodiment of the present invention.

FIGS. 14 and 15 illustrate another method for representing a preamble structure and a pilot structure according to the embodiment of the present invention.

Referring to FIG. 14, one preamble sequence may have a repeated structure and may be transmitted to MSs in a second OFDMA symbol. In addition, the preamble may be transmitted from the BS through a predetermined antenna in CDD. To achieve antenna diversity, BCH 1 carrying NCI may be transmitted through an SFN, whereas BCH 2 carrying CSI may be transmitted in SFBC.

No pilots are allocated to symbols carrying BCH 1, whereas pilots for the first and second antennas are allocated only to symbols carrying BCH 2. Because BCH 1 can be decoded using the preamble sequence, it does not need pilots. BCH 2 may be segmented to prevent ICI.

The preamble sequence of FIG. 14 may be phase-shifted in order to prevent ICI. The pilot signal may be shifted on the frequency axis for each neighbor cell. An MS may acquire synchronization with the BS and estimate a frequency offset and decode a cell ID, using the preamble sequence. In addition, the MS may decode information about the size of the cell ID or a sector ID.

FIG. 15 illustrates a method for designing the preamble structure and the pilot structure illustrated in FIG. 14. The preamble and pilot structures illustrated in FIG. 15 are the same as those of FIG. 14, except that CSI is segmented in three to prevent ICI. In FIG. 15(a), Cell A may transmit CSI A including SI specific to Cell A to an MS in a third segment. In FIG. 15(b), Cell B may transmit CSI B including SI specific to Cell B to an MS in the third segment. In FIG. 15(c), Cell C may transmit CSI C including SI specific to Cell C to an MS in the third segment.

In the illustrated case of FIG. 15, each cell or sector may be identified by changing each preamble by a predetermined sequence. For example, a specific BS may distinguish each cell from the other cells by shifting a preamble structure repeated on the time axis or changing a preamble sequence.

Figure 16:
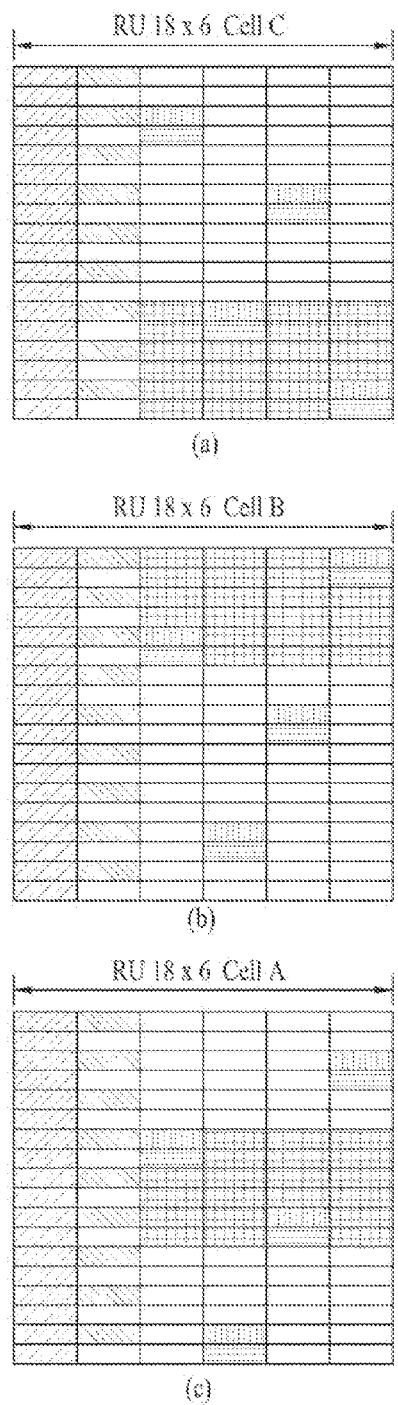
FIG. 16 illustrates a further method for representing a preamble structure and a pilot structure according to the embodiment of the present invention.

FIG. 16 illustrates a further method for representing a preamble structure and a pilot structure according to the embodiment of the present invention.

FIGS. 16(a), 16(b) and 16(c) illustrate structures of the first subframe of a superframe for use in the cell areas of adjacent BSs. In FIG. 16, it is assumed that NCI is transmitted to MSs on BCH 1 and CSI is transmitted to MSs on BCH 2. It is also assumed that a BS and an MS each use two transmission and reception antennas.

In FIG. 16, one RB may include 18 subcarriers by 6 OFDMA symbols. Referring to FIG. 16(a), BCH 1 may be allocated to a first OFDMA symbol, a preamble (or an SCH) may be allocated to a second OFDMA symbol, and BCH 2 may be allocated to third to sixth OFDMA symbols. The preamble may be segmented and allocated to odd-numbered or even-numbered subcarriers.

Referring to FIGS. 16(b) and 16(c), no pilots are allocated to BCH 1 carrying the NSI and the preamble, whereas pilots are allocated only to BCH 2 carrying CSI. Hence, only the pilots allocated to the third to sixth OFDMA symbols occupied by BCH 2 are cyclically shifted. The pilot structures of FIGS. 16(b) and 16(c) are created by cyclically shifting the pilot structure of FIG. 16(a) by units of two subcarriers.

Figure 17:
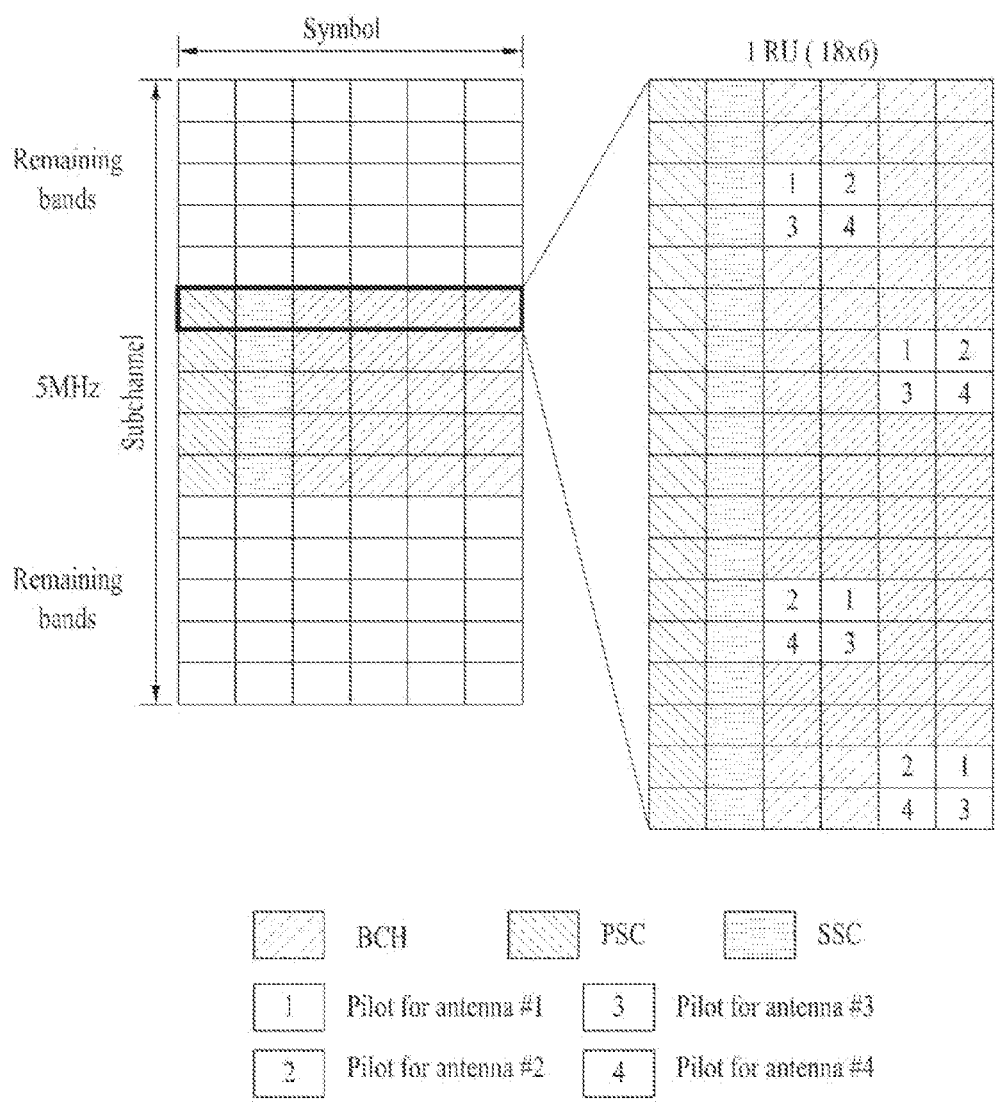
FIG. 17 illustrates one of methods for representing a subframe structure according to a further embodiment of the present invention.

FIG. 17 illustrates one of methods for representing a subframe structure according to a further embodiment of the present invention.

In the subframe structure of FIG. 17, two preambles, PSC and SSC are used and a BCH is allocated to the remaining region. The PSC is allocated to the first OFDMA symbol of a subframe and the SSC is allocated to the second OFDMA symbol of the subframe. The PSC and SSC may be allocated to other OFDMA symbols in the same subframe. For instance, the PSC and SSC may be allocated to the third and fourth OFDMA symbols, respectively.

In FIG. 17, the PSC and the SSC may be transmitted from the BS through the first antenna (Ant #k1). For antenna transmit diversity, the BCH may be transmitted through 2 Tx antennas or 4 Tx antennas, independently of the PSC and the SSC. An MS may decode the preambles (i.e. the PSC and SSC) and the BCH through blind decoding.

In the illustrated case of FIG. 17, the preambles are located only at the start of a subframe. Therefore, a single BCH region may be formed, thereby decreasing transmission complexity. However, the channel estimation performance of the last symbol part (fifth and sixth symbols) of the subframe may be degraded.

Figure 18:
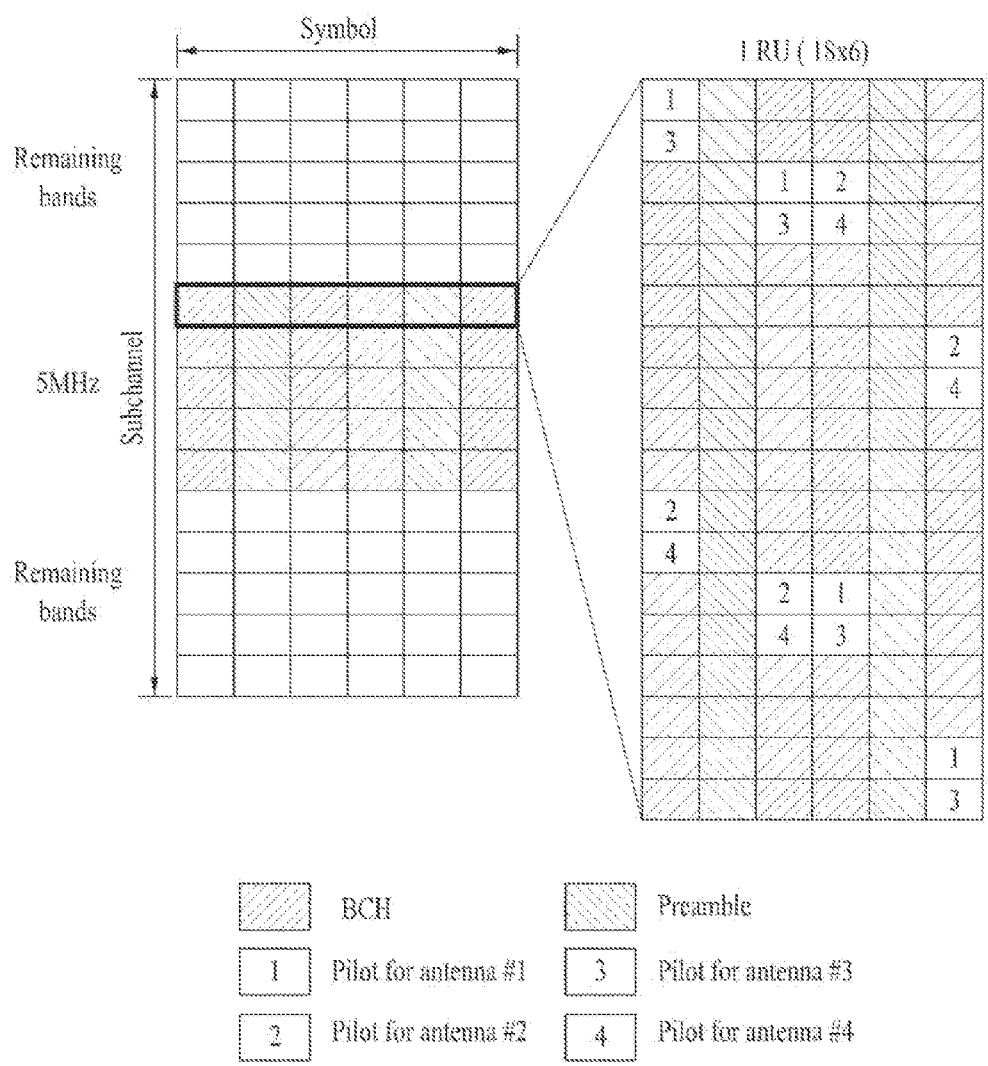
FIG. 18 illustrates another method for representing a subframe structure according to the embodiment of the present invention.

FIG. 18 illustrates another method for representing a subframe structure according to the embodiment of the present invention.

Referring to FIG. 18, two preambles are allocated to a single subframe, apart from each other by a predetermined number of symbols to facilitate channel estimation and/or BCH decoding. Herein, the BS uses four Tx antennas and thus pilot symbols for each antenna may be allocated to a BCH symbol region, for channel estimation, as illustrated in FIG. 18.

In FIG. 18, the preambles are allocated to second and fourth OFDMA symbols. To achieve antenna transmit diversity, the BS may transmit the preambles through the first antenna and a BCH through 2 Tx or 4 Tx antennas independently of the preambles. An MS may decode the preambles (i.e. a PSC and an SSC) and the BCH through blind decoding.

Figure 19:
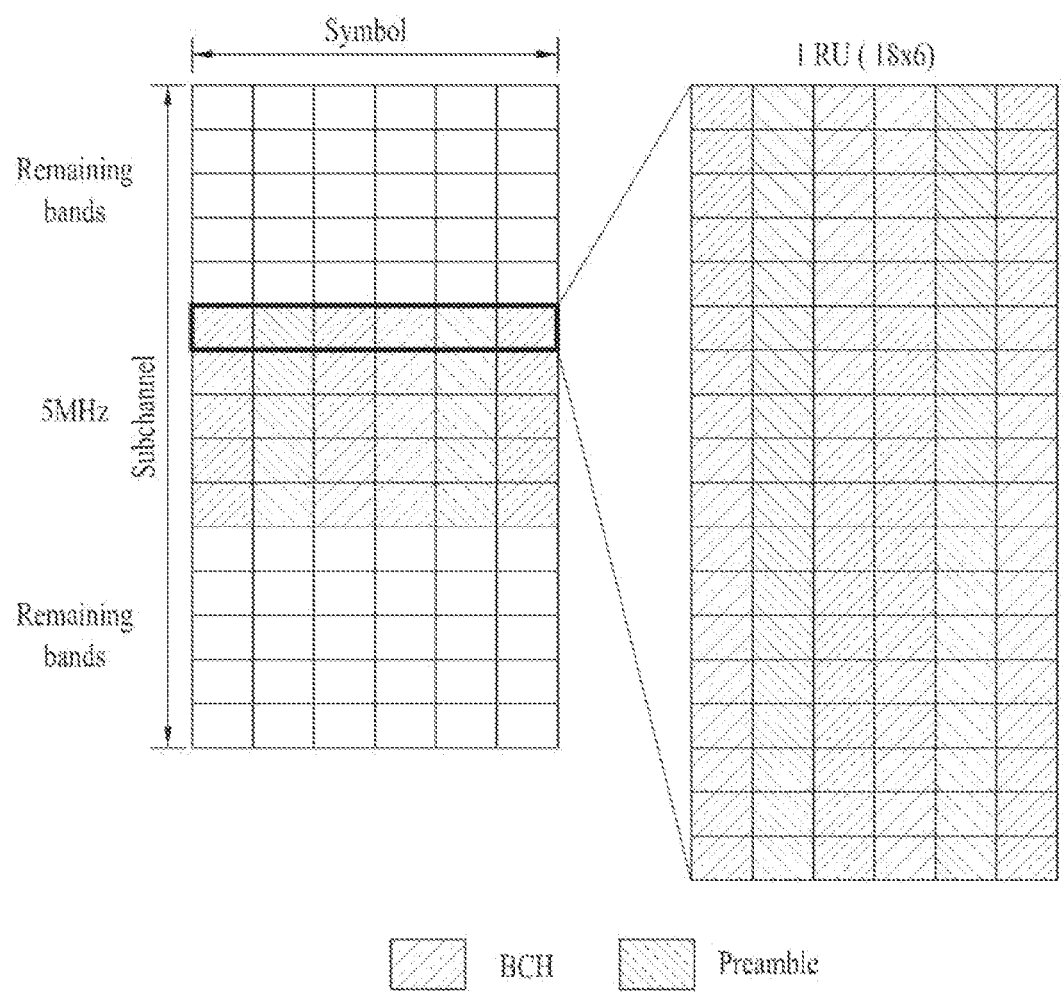
FIG. 19 illustrates another method for representing a subframe structure according to the embodiment of the present invention.

FIG. 19 illustrates another method for representing a subframe structure according to the embodiment of the present invention.

The preamble structure illustrated in FIG. 19 is the same as the preamble structure illustrated in FIG. 18, except that a BS may transmit preambles to MSs through all antennas in CDD. The BS may also transmit a BCH to MSs in CDD.

In this case, pilot symbols are not needed for channel estimation or decoding each channel. That is, the preambles suffice for the MS to decode each channel. Accordingly, there is no need for allocating pilots in the subframe structure illustrated in FIG. 19.

Figure 20:
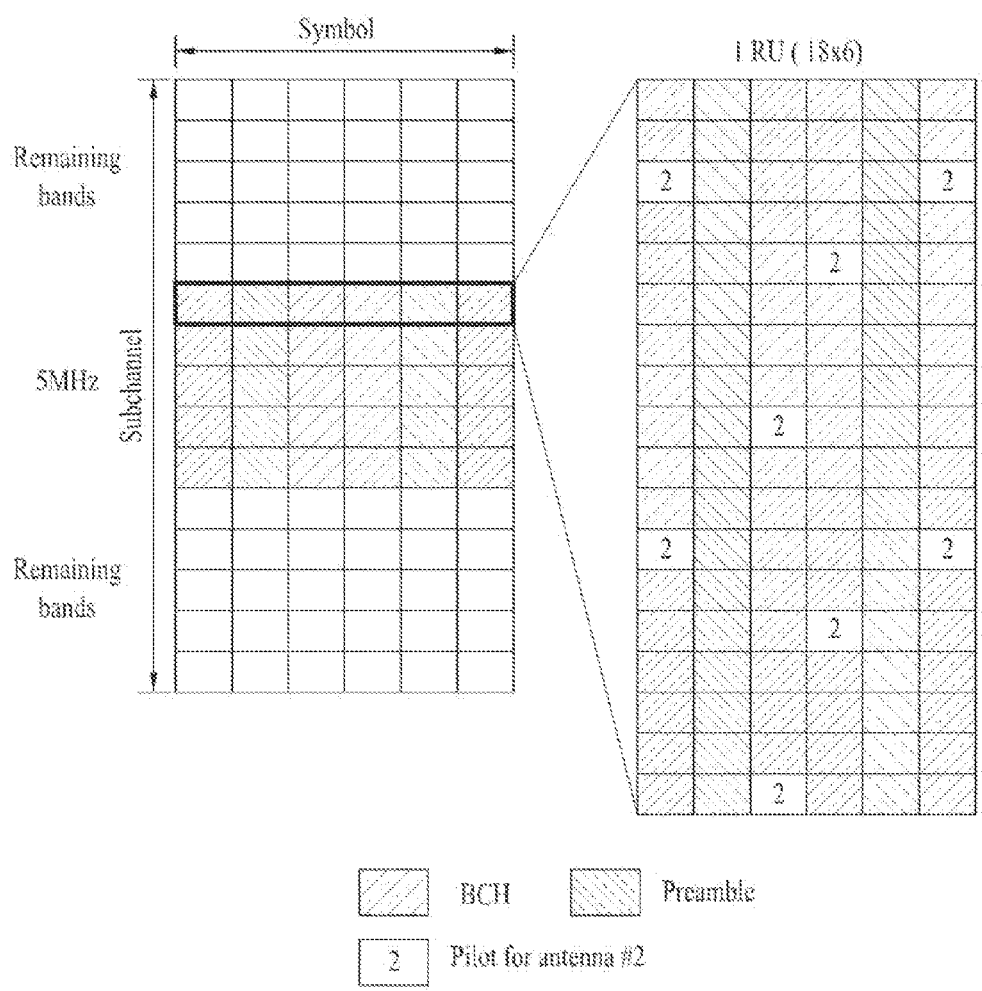
FIG. 20 illustrates another method for representing a subframe structure according to the embodiment of the present invention.

FIG. 20 illustrates another method for representing a subframe structure according to the embodiment of the present invention.

The preamble structure illustrated in FIG. 20 is the same as the preamble structure illustrated in FIG. 18. When a BS employs the subframe structure of FIG. 20, it may use 2 Tx antennas. Notably, preambles may be transmitted from the BS through the first antenna and a BCH may be transmitted from the BS through the first and second antennas. For channel estimation of the BCH, pilot symbols allocated to the second antenna may suffice. The BS may transmit the BCH in SFBC. An MS may decode the BCH using the preambles and the pilots.

Figure 21:
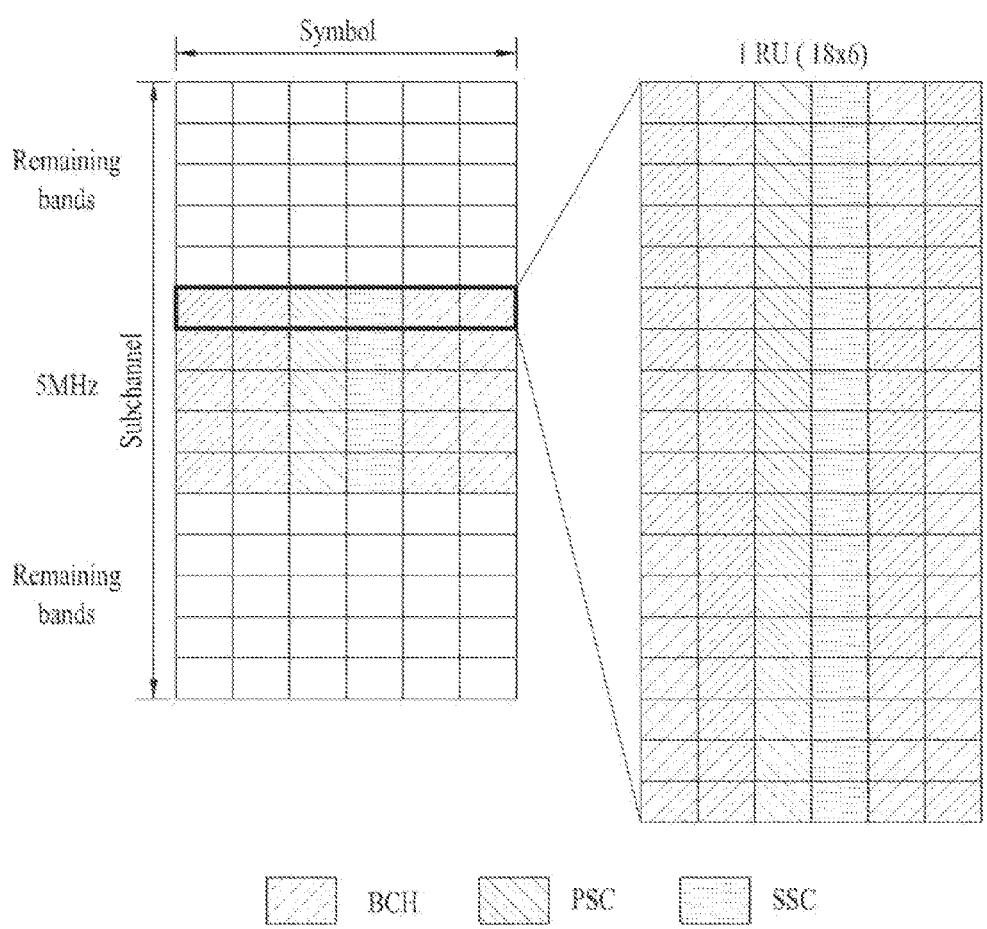
FIG. 21 illustrates another method for representing a subframe structure according to the embodiment of the present invention.

FIG. 21 illustrates another method for representing a subframe structure according to the embodiment of the present invention.

Referring to FIG. 21, two preamble symbols are used. A first preamble (i.e. a PSC) may be transmitted from the BS to MSs through the first antenna and a second preamble (i.e. an SSC) may be transmitted from the BS to MSs through the second antenna.

The BS may transmit a BCH to MSs in SFBC. In FIG. 21, only the preambles are used for channel estimation. This means that pilots are not allocated. An MS may decode the BCH using only the two preambles.

In FIG. 21, the preambles are allocated to symbols in the middle of a subframe. In this case, channel estimation performance is better than in a case where a preamble resides at the start or end of a subframe. However, since a BCH region is divided in two, transmission complexity may be increased.

Figure 22:
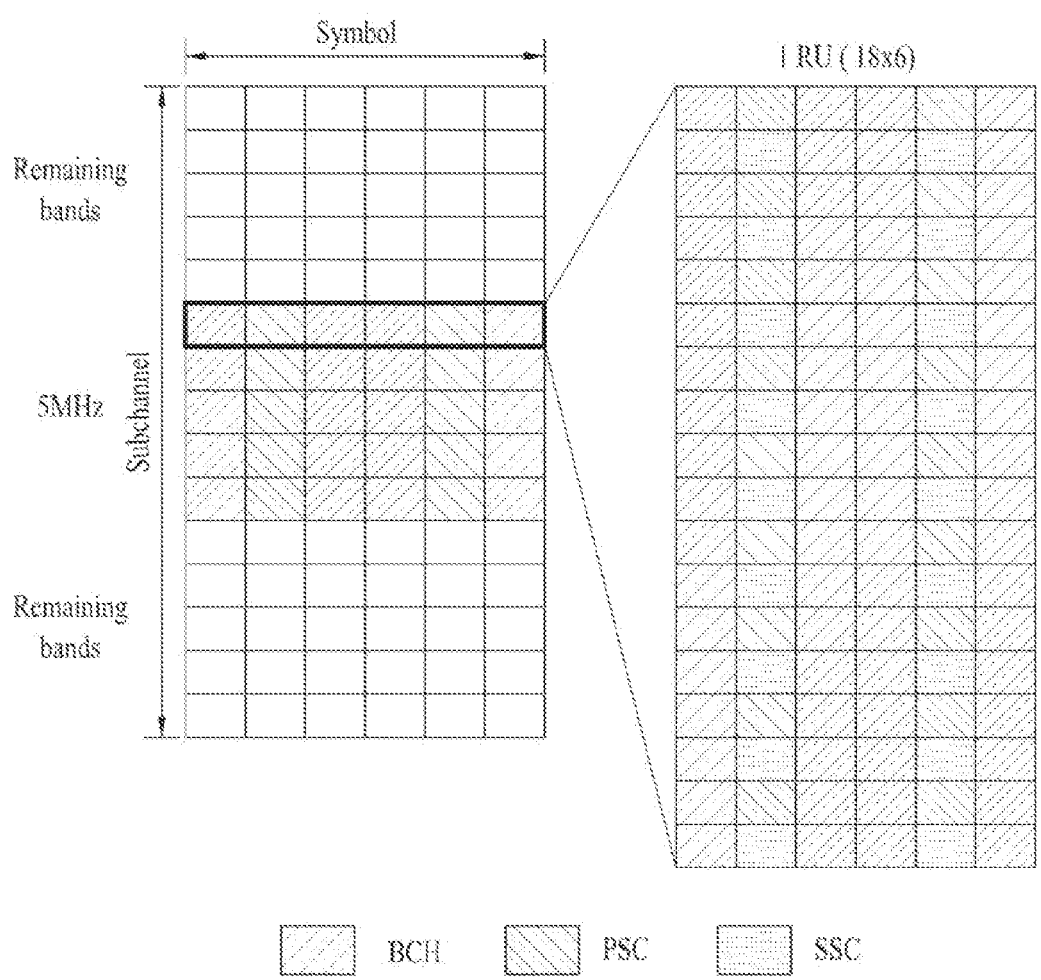
FIG. 22 illustrates another method for representing a subframe structure according to the embodiment of the present invention.

FIG. 22 illustrates another method for representing a subframe structure according to the embodiment of the present invention.

Referring to FIG. 22, two preambles are used. Each preamble has a repeated structure by being allocated to odd-numbered or even-numbered subcarriers. The preambles may be allocated to second and fourth OFDMA symbols. In FIG. 22, a first preamble (i.e. a PSC) is allocated to even-numbered subcarriers and a second preamble (i.e. an SCH) is allocated to odd-numbered subcarriers.

The first and second preambles may be transmitted to MSs by the BS through the first and second antennas, respectively. The BS may transmit a BCH to MSs through the first and second antennas in SFBC. In this case, the MS may decode the BCH using the first and second preambles without using pilots.

In another transmission scheme, all preambles may be transmitted in CDD in FIG. 22. The BCH may also be transmitted to MSs in CDD. In this case, the MS may decode the BCH using the first and second preambles without using pilots.

Figure 23:
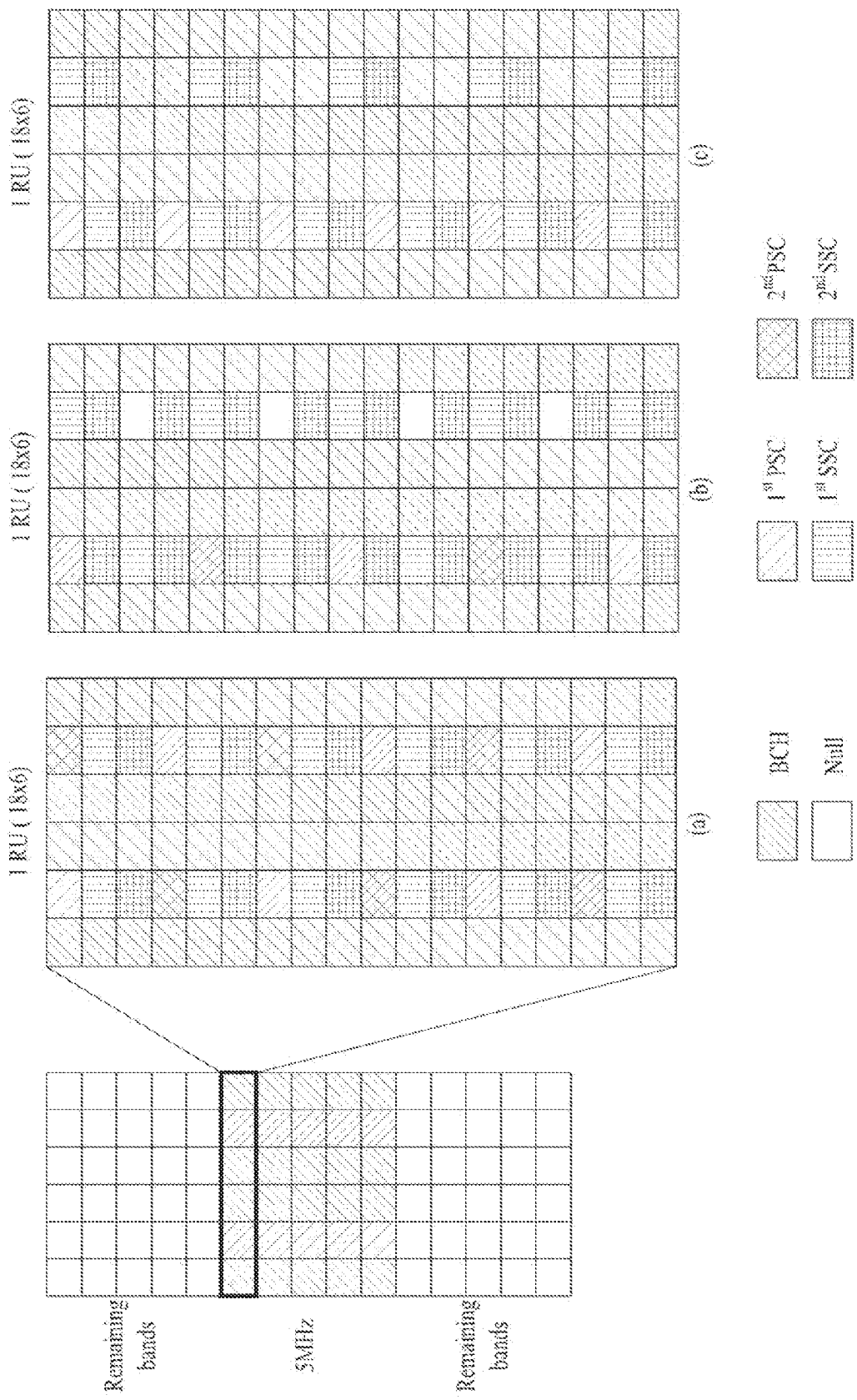
FIG. 23 illustrates another method for representing a subframe structure according to the embodiment of the present invention.

FIG. 23 illustrates another method for representing a subframe structure according to the embodiment of the present invention.

The SCH structure (or preamble structure) illustrated in FIG. 23 is similar to the SCH structure illustrated in FIG. 19. That is, two SCH symbols are allocated to a single subframe. The SCH symbols may be allocated to second and fourth OFDMA symbols. Each SCH may include a PSC and an SSC.

Referring to FIG. 23(a), a first PSC, a first SSC, a second PSC, and a second SSC may be allocated to a subframe region. In the second OFDMA symbol, the first PSC is repeatedly allocated every 6 subcarriers, starting from a first subcarrier, the first SSC is repeatedly allocated every 3 subcarriers, starting from a second subcarrier, the second PSC is repeatedly allocated every 6 subcarriers, starting from a fourth subcarrier, and the second SSC is repeatedly allocated every 3 subcarriers, starting from a third subcarrier.

In the fourth OFDMA symbol, the first PSC is repeatedly allocated every 6 subcarriers, starting from the fourth subcarrier, the first SSC is repeatedly allocated every 3 subcarriers, starting from the second subcarrier, the second PSC is repeatedly allocated every 6 subcarriers, starting from the first subcarrier, and the second SSC is repeatedly allocated every 3 subcarriers, starting from the third subcarrier.

Referring to FIG. 23(b), the first PSC, the second PSC, the first SSC and the second SSC may be allocated to the OFDMA symbol, whereas only the first and second SSCs may be allocated to the fourth OFDMA symbol. In the second OFDMA symbol, the first PSC is repeatedly allocated every 6 subcarriers, starting from the first subcarrier, the first SSC is repeatedly allocated every 4 subcarriers, starting from the third subcarrier, the second PSC is repeatedly allocated every 8 subcarriers, starting from the fifth subcarrier, and the second SSC is repeatedly allocated every other subcarrier, starting from the second subcarrier.

In the fourth OFDMA symbol, the first SSC is repeatedly allocated every 4 subcarriers, starting from the first subcarrier, and the second SSC is repeatedly allocated every other subcarrier, starting from the second subcarrier. Herein, a null symbol is positioned at the third subcarrier and every fourth subcarrier, starting from the third subcarrier, is punctured.

Referring to FIG. 23(c), in the second OFDMA symbol, the first PSC is repeatedly allocated every 4 subcarriers, starting from the first subcarrier, the first SSC is repeatedly allocated every 4 subcarriers, starting from the second subcarrier, and the second SSC is repeatedly allocated every 3 subcarriers, starting from the third subcarrier.

In the fourth OFDMA symbol, the first SSC is repeatedly allocated every 4 subcarriers, starting from the first subcarrier and the second SSC is repeatedly allocated every 4 subcarriers, starting from the second subcarrier.

In FIG. 23, in the first SCH, the first PSC and SSC are transmitted to MSs through the first antenna (Ant #k1) of the BS and the second PSC and SSC are transmitted to MSs through the second antenna (Ant #k2) of the BS.

In the second SCH, the first PSC and SSC are transmitted to MSs through the second antenna (Ant #k2) of the BS and the second PSC and SSC are transmitted to MSs through the first antenna (Ant #k1) of the BS.

As another preamble transmission method of FIG. 23, in the first SCH, the first PSC and SSC are transmitted to MSs through the first antenna (Ant #k1) of the BS and the second PSC and SSC are transmitted to MSs through the second antenna (Ant #k2) of the BS.

In the second SCH, the first PSC and SSC are transmitted to MSs through the first antenna (Ant #k1) of the BS and the second PSC and SSC are transmitted to MSs through the second antenna (Ant #k2) of the BS.

In FIG. 23, the BS may transmit a BCH to MSs in SFBC. AN MS may decode the BCH using the SCHs without using pilots.

Figure 24:
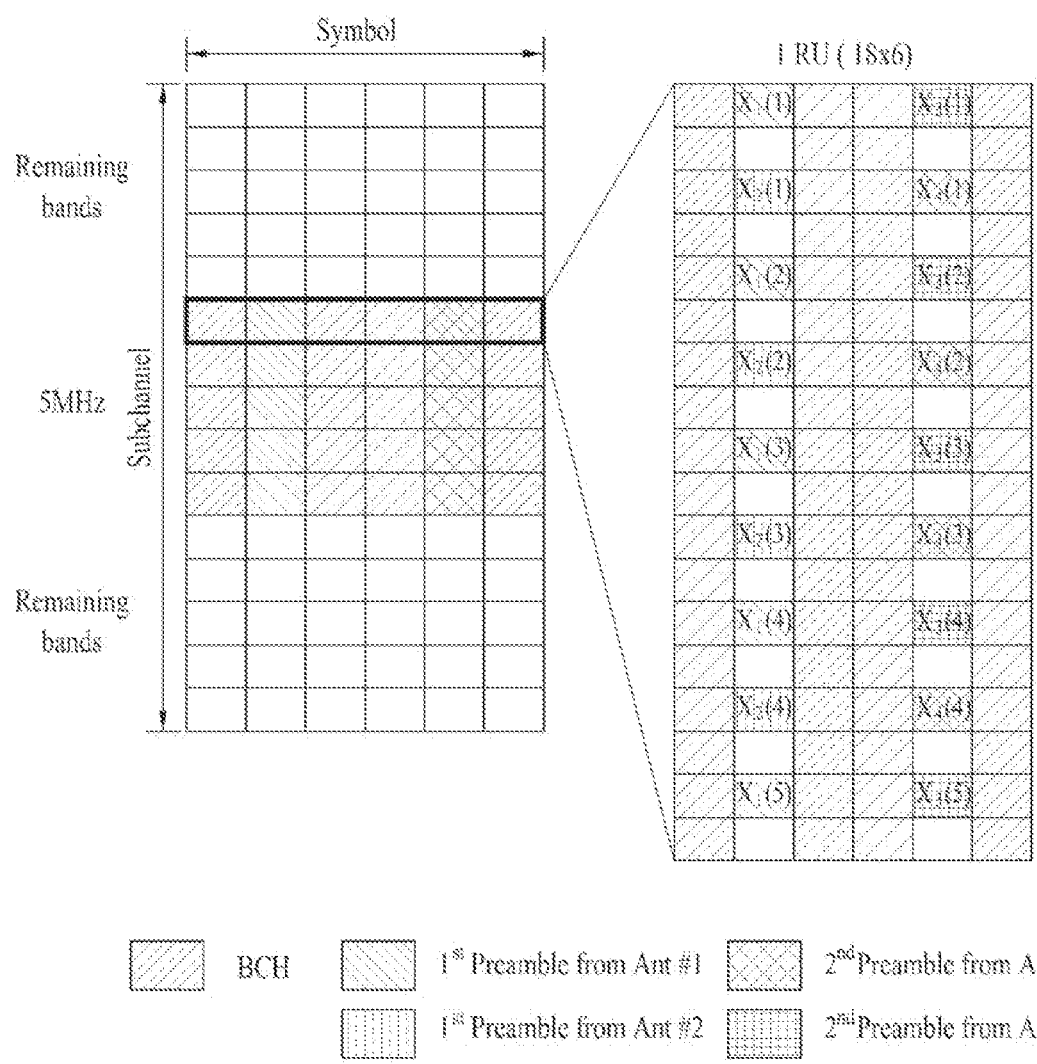
FIG. 24 illustrates a further method for representing a subframe structure according to the embodiment of the present invention.

FIG. 24 illustrates a further method for representing a subframe structure according to the embodiment of the present invention.

In accordance with embodiments of the present invention, the BS may allocate an SCH sequence only to odd-numbered (or even-numbered) subcarriers to configure a pattern repeated in time. An MS may decode NCI included in a BCH using the SCH.

Referring to FIG. 24, two preambles are used. Each preamble (or SCH) may include a PSC and an SSC.

The two preambles may be allocated to the second and fourth OFDMA symbols of a first subframe, respectively. In FIG. 24, the PSC and SSC of a first preamble are allocated to the second OFDMA symbol and the PSC and SSC of a second preamble are allocated to the fourth OFDMA symbol.

In the preamble structure, each SCH may be identified by its preamble sequence S1, S2, and SN. The preamble sequence may be divided according to the number of antennas. For instance, for a BS with 4 Tx antennas, a preamble sequence may be divided into four parts X1, X2, X3 and X4. Herein, X1 may include S1, S2, . . . , SN/4 and X2 may include SN/4+1, SN/4+2, . . . , SN/2. In this manner, X3 and X4 each may include preamble sequence segments.

In FIG. 4, each Tx antenna may be identified by a preamble sequence. Accordingly, the BS may transmit a preamble sequence to MSs according to each antenna and may transmit a BCH to MSs in SFBC. An MS may decode the BCH successfully using the preamble sequences without using pilot signals.

A description will be given of an MS and a BS for implementing the embodiments of the present invention described with reference to FIGS. 3 to 24, according to an embodiment of the present invention.

The MS may operate as a transmitter on an uplink and as a receiver on a downlink. The BS may operate as a receiver on an uplink and as a transmitter on a downlink. That is, each of the MS and the BS may include a transmitter and a receiver for transmitting information or data.

The transmitter and the receiver each may include a processor, a module, a part and/or means to implement the embodiments of the present invention. Especially the transmitter and the receiver each may include a module (means) for encrypting a message, a module for decrypting an encrypted message, and an antenna for transmitting and receiving messages.

The MS used in the embodiments of the present invention may include a low-power Radio Frequency/Intermediate Frequency (RF/IF) module. In addition, the MS may include means, modules or parts for performing a control function, a Medium Access Control (MAC) frame conversion control function based on service characteristics and a propagation environment, a handover function, an authentication and encryption function, a packet modulation and demodulation function for data transmission, a high-speed packet channel coding function, and a real-time modem control function in order to implement the above-described embodiments of the present invention.

The BS may transmit data received from a higher layer to the MS in a wireless or wired fashion. The BS may include a low-power RF/IF module. In addition, the BS may include means, modules or parts for performing a control function, OFDMA packet scheduling, Time Division Duplex (TDD) packet scheduling and channel multiplexing, a MAC frame conversion control function based on service characteristics and a propagation environment, a handover function, an authentication and encryption function, a packet modulation and demodulation function for data transmission, a high-speed packet channel coding function, and a real-time modem control function in order to implement the above-described embodiments of the present invention.

As is apparent from the above description, the embodiments of the present invention have the following effects.

Firstly, a user can efficiently transmit system information.

Secondly, the amount of resources used for transmitting system information can be reduced. As an SFN is used, channel noise can be decreased.

Thirdly, an MS can perform channel estimation efficiently and decode system information efficiently.

Fourthly, a BS can reduce inter-cell interference from a neighbor BS, using a subframe structure, a preamble structure, and a pilot structure according to embodiments of the present invention.

Fifthly, as described in the embodiments of the present invention, the BS can conserve radio resources by transmitting system information to an MS through an SFN and increase the channel measurement performance of a BCH at the MS by using a different pilot pattern structure for a BCH on a cell basis.

The above-described advantageous effects are purely exemplary. Therefore, it is obvious that other individual and additional distinctive effects can be achieved from each embodiment.

The embodiments of the present invention are applicable to various wireless access systems including a 3GPP system, a 3GPP2 system, and/or an IEEE 802.xx system. Besides these wireless access systems, the exemplary embodiments of the present invention are applicable to all technical fields to which wireless access systems are applied.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It will be obvious to those skilled in the art that claims that are not explicitly cited in each other in the appended claims may be presented in combination as an exemplary embodiment of the present invention or included as a new claim by a subsequent amendment after the application is filed.

What is claimed is:

1. A method for receiving system information in a wireless access system, the method comprising:
   receiving a Network Common Information (NCI) channel including network common system information from a Base Station (BS);
   receiving a synchronization channel from the BS, for acquiring synchronization with the BS;
   receiving a Cell Specific Information (CSI) channel including cell specific system information which is specific to the BS from the BS; and
   decoding the NCI channel and the CSI channel using the synchronization channel,
   wherein the NCI channel is transmitted over a Single Frequency Network (SFN) which is a broadcast network where the BS and a neighbor BS simultaneously transmit a same NCI over a same frequency channel, and
   wherein the synchronization channel is located between the NCI channel and the CSI channel in a subframe.

2. The method according to claim 1, wherein the NCI channel, the synchronization channel, and the CSI channel are allocated to a first subframe of a superframe.

3. The method according to claim 2, wherein the NCI channel is a primary broadcast channel and the CSI channel is a secondary broadcast channel.

4. The method according to claim 2, wherein the synchronization channel includes a primary synchronization channel and a secondary synchronization channel.

5. The method according to claim 1, wherein the CSI is transmitted at a position different from a position of CSI of a neighbor BS in at least time or frequency in the subframe.

6. A method for transmitting system information in a wireless access system, the method comprising:
   transmitting a Network Common Information (NCI) channel including network common system information to a Mobile Station (MS);
   transmitting a synchronization channel to the MS, for synchronization with a Base Station (BS); and
   transmitting to the MS a Cell Specific Information (CSI) channel including cell specific system information which is specific to the BS,
   wherein the NCI channel is transmitted over a Single Frequency Network (SFN) which is a broadcast network where the BS and a neighbor BS simultaneously transmit a same NCI over a same frequency channel, and
   wherein the synchronization channel is located between the NCI channel and the CSI channel in a subframe.

7. The method according to claim 6, wherein the NCI channel, the synchronization channel, and the CSI channel are allocated to a first subframe of a superframe.

8. The method according to claim 7, wherein the NCI channel is a primary broadcast channel and the CSI channel is a secondary broadcast channel.

9. The method according to claim 7, wherein the synchronization channel includes a primary synchronization channel and a secondary synchronization channel.

10. The method according to claim 6, wherein the CSI is transmitted at a position different from a position of CSI of a neighbor BS in at least time or frequency in the subframe.

11. The method according to claim 1, wherein the synchronization channel is located next to the NCI channel in the subframe.

12. The method according to claim 1, wherein the CSI channel is transmitted in a more robust Modulation Coding Scheme (MCS) than the NCI channel.

13. The method according to claim 6, wherein the synchronization channel is located next to the NCI channel in the subframe.

14. The method according to claim 6, wherein the CSI channel is transmitted in a more robust Modulation Coding Scheme (MCS) than the NCI channel.

* * * * *